(12) United States Patent
Lindskog et al.

(10) Patent No.: US 9,613,539 B1
(45) Date of Patent: Apr. 4, 2017

(54) DAMAGE AVOIDANCE SYSTEM FOR UNMANNED AERIAL VEHICLE

(71) Applicant: Amazon Technologies, Inc., Seattle, WA (US)

(72) Inventors: Jon Lewis Lindskog, Seattle, WA (US); Daniel Buchmueller, Seattle, WA (US); Samuel Park, Seattle, WA (US); Louis LeRoi LeGrand, III, Seattle, WA (US); Ricky Dean Welsh, Bellevue, WA (US); Fabian Hensel, Zurich (CH); Christopher Aden Maynor, Boston, MA (US); Ishwarya Ananthabhotla, Kings Park, NY (US); Scott Michael Wilcox, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 116 days.

(21) Appl. No.: 14/500,826

(22) Filed: Sep. 29, 2014

Related U.S. Application Data

(60) Provisional application No. 62/039,377, filed on Aug. 19, 2014.

(51) Int. Cl.
  *G08G 5/04* (2006.01)
  *B64C 39/02* (2006.01)
  (Continued)

(52) U.S. Cl.
  CPC .............. *G08G 5/04* (2013.01); *B64C 39/02* (2013.01); *B64D 17/80* (2013.01); *B64D 45/00* (2013.01); *H02K 7/183* (2013.01)

(58) Field of Classification Search
  CPC .......... G08G 5/04; G08G 5/045; B64D 17/00; B64D 17/62; B64D 17/72; B64D 17/725;
  (Continued)

(56) References Cited

U.S. PATENT DOCUMENTS

| 5,673,873 A | * | 10/1997 | Stemme | ................. B64D 17/80 244/139 |
| 5,992,794 A | * | 11/1999 | Rotman | ................. B64C 25/32 244/138 R |

(Continued)

FOREIGN PATENT DOCUMENTS

| NL | 1028110 C2 | * | 12/2005 | ............ B60R 21/00 |
| RU | 2096272 C1 | * | 11/1997 | |

OTHER PUBLICATIONS

Translation of NL 1028110 C2, Google translate (see above foreign patent documents), obtained Nov. 20, 2016.*

(Continued)

*Primary Examiner* — Thomas G Black
*Assistant Examiner* — Sara Lewandroski
(74) *Attorney, Agent, or Firm* — Athorus, PLLC

(57) ABSTRACT

This disclosure describes an unmanned aerial vehicle ("UAV") and system that may perform one or more techniques for protecting objects from damage resulting from an unintended or uncontrolled impact by a UAV. As described herein, various implementations utilize a damage avoidance system that detects a risk of damage to an object caused by an impact from a UAV that has lost control and takes steps to reduce or eliminate that risk. For example, the damage avoidance system may detect that the UAV has lost power and/or is falling at a rapid rate of descent such that, upon impact, there is a risk of damage to an object with which the UAV may collide. Upon detecting the risk of damage and prior to impact, the damage avoidance system activates a damage avoidance system having one or more protection elements that work in concert to reduce or prevent damage to the object upon impact by the UAV.

20 Claims, 22 Drawing Sheets

(51) Int. Cl.
*B64D 45/00* (2006.01)
*B64D 17/80* (2006.01)
*H02K 7/18* (2006.01)

(58) Field of Classification Search
CPC .............. B64D 17/80; B64D 2045/0095; B64D 45/04; B64D 45/06; B64D 2201/00; B64D 2700/62043; B64D 2700/6207; B64D 2700/62438; B64D 2700/62473; B64D 2700/62587; B64D 2700/62596; B64D 2700/62666; G05D 1/0808; G01S 13/9303; G01S 13/93; B64C 2700/6205; B64C 2201/00; B64C 2201/14; B64C 2201/141; B64C 2201/185; B64C 2203/00
USPC ................................. 701/301, 3, 4, 10, 14
See application file for complete search history.

(56) References Cited

U.S. PATENT DOCUMENTS

| | | | | |
|---|---|---|---|---|
| 6,338,457 B1* | 1/2002 | Hilliard | .................. | B64D 17/80 244/137.4 |
| 8,794,567 B2* | 8/2014 | Adir | ................. | B64C 15/14 244/52 |
| 8,979,023 B1* | 3/2015 | Wang | ..................... | B64C 25/32 244/100 A |
| 2001/0048050 A1* | 12/2001 | Grieser | .................. | B64D 17/80 244/152 |
| 2003/0057327 A1* | 3/2003 | Carroll | .................. | B64C 39/024 244/139 |
| 2007/0145193 A1* | 6/2007 | Hakki | .................... | B64D 17/80 244/139 |
| 2010/0292871 A1* | 11/2010 | Schultz | .................. | G01C 21/00 701/3 |
| 2012/0101666 A1* | 4/2012 | Hill | ........................ | B64D 25/00 701/3 |
| 2013/0175398 A1* | 7/2013 | Chia | ..................... | B64D 25/12 244/139 |
| 2014/0252166 A1* | 9/2014 | Smith | .................... | B64C 25/56 244/107 |
| 2015/0012154 A1* | 1/2015 | Senkel | .................. | B64D 17/80 701/4 |
| 2015/0039159 A1* | 2/2015 | Litwinowicz | ........... | B64C 19/00 701/3 |
| 2015/0175258 A1* | 6/2015 | Lee | ........................ | B64C 27/08 244/17.23 |
| 2015/0314881 A1* | 11/2015 | Tsaliah | .................... | B64D 17/72 244/146 |
| 2016/0012730 A1* | 1/2016 | Jarrell | .................. | G08G 5/0069 701/8 |

OTHER PUBLICATIONS

Translation of RU 2096272 C1, espacenet (see above foreign patent documents), obtained Nov. 20, 2016.*

* cited by examiner

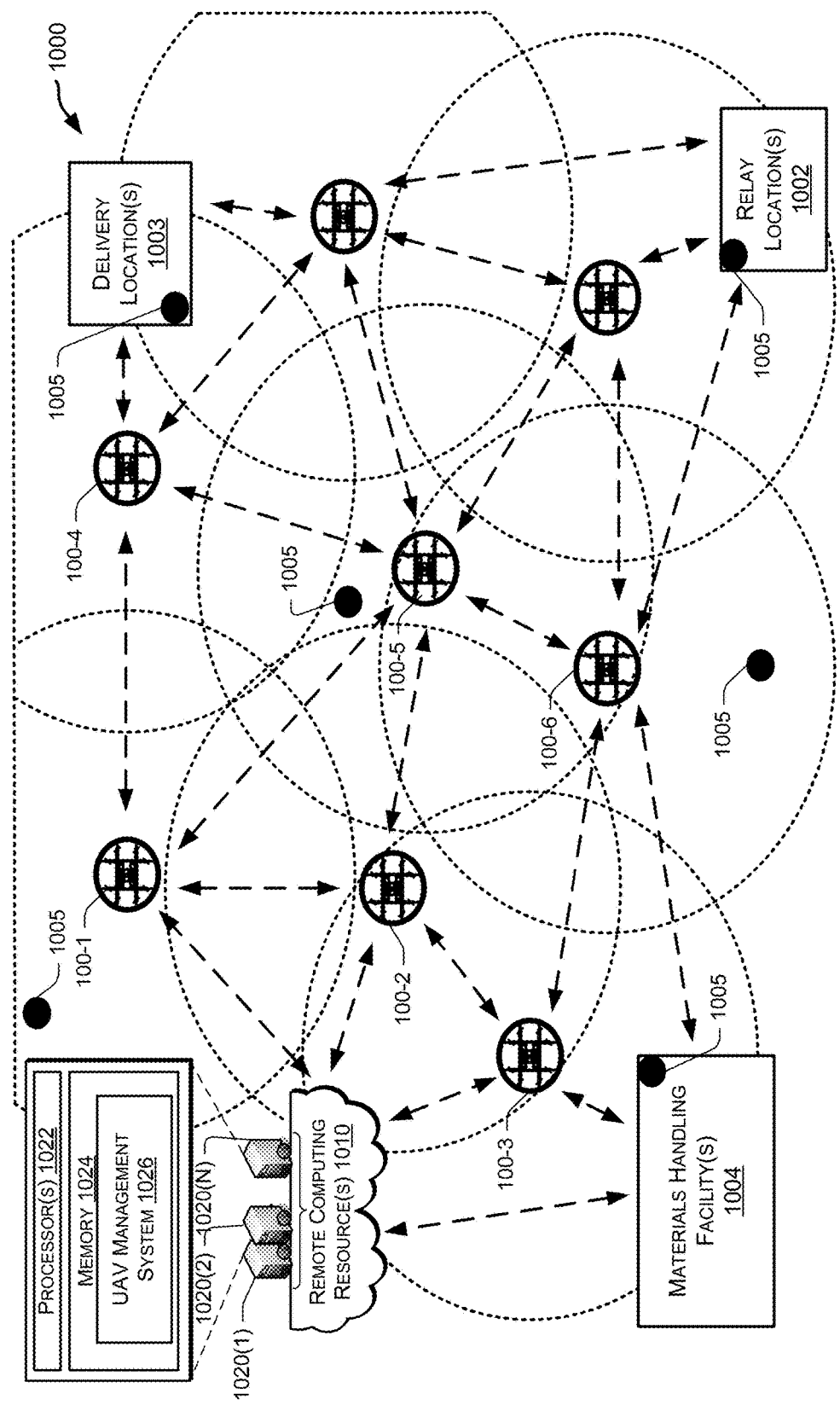

DAMAGE AVOIDANCE SYSTEM FOR UNMANNED AERIAL VEHICLE

CROSS-REFERENCE TO RELATED APPLICATION

This application claims priority to U.S. Provisional Application 62/039,377, filed Aug. 19, 2014, entitled "Protecting Automated Aerial Vehicles From Impact Damage," which is incorporated herein by reference in its entirety.

BACKGROUND

Unmanned aerial vehicles are continuing to increase in use. For example, unmanned aerial vehicles are often used for surveillance. While there are many beneficial uses of unmanned aerial vehicles, they also have many drawbacks. For example, unmanned aerial vehicles that utilize four propellers for flight (a/k/a, quad-copters) become unstable if two or more of the propellers lose power or become damaged. Similarly, if the navigation system becomes inoperable, the power supply is depleted, etc., and continued flight of the unmanned aerial vehicle may not be possible.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 10 is a diagram of an unmanned aerial vehicle environment, according to an implementation.

Figure 1A:
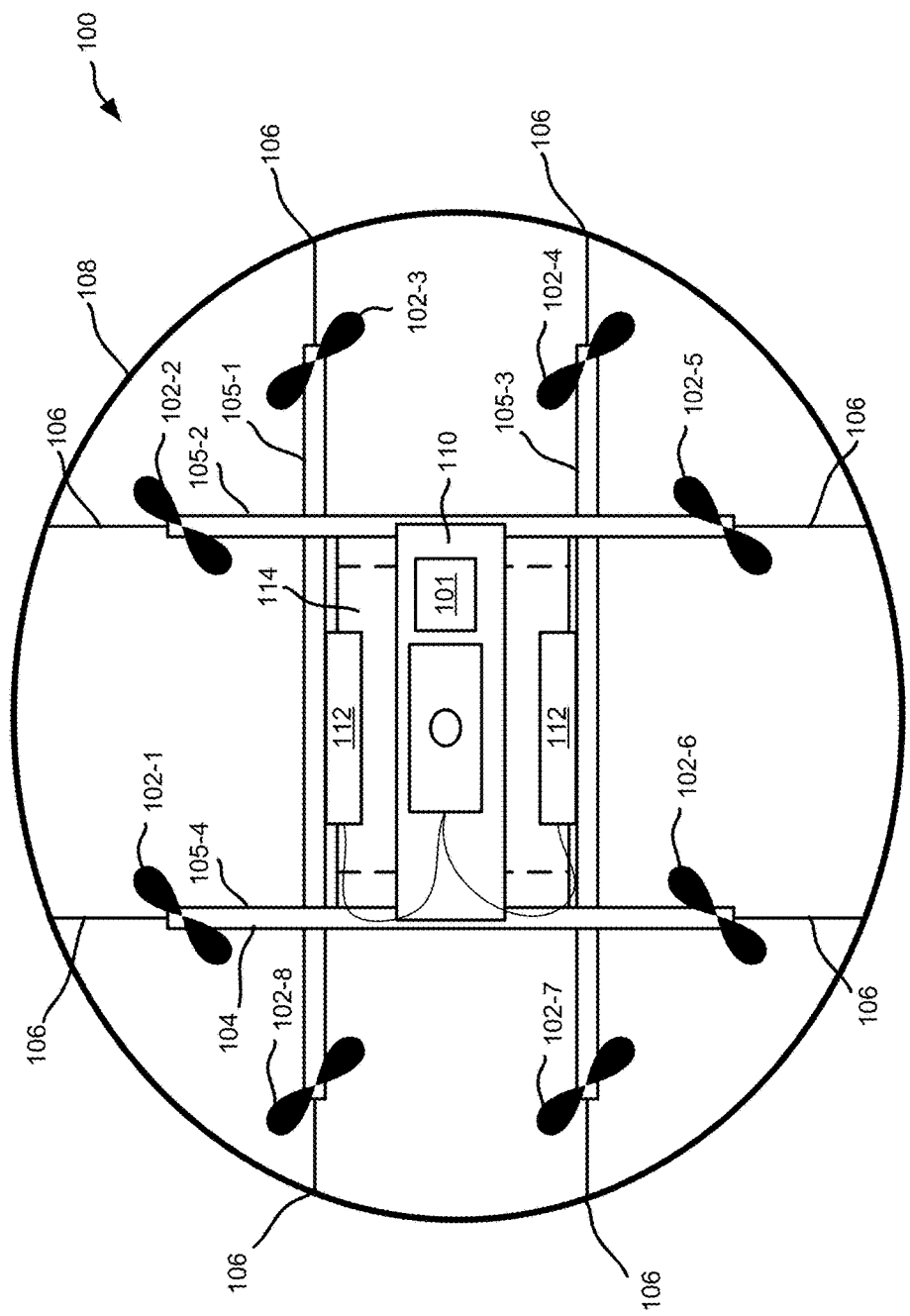
FIG. 1A depicts a block diagram of a top-down view of an unmanned aerial vehicle with a damage avoidance system, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes an unmanned aerial vehicle ("UAV") and system that may perform one or more techniques for protecting an object and/or the UAV from damage resulting from an impact between the object (e.g., animal, automobile, building, ground) and the UAV. As described herein, various implementations utilize a damage avoidance system that detects a risk of damage to an object caused by an uncontrolled impact by the UAV and takes steps to reduce or eliminate that risk of damage to the object. For example, the damage avoidance system may detect that the UAV has lost power, is not following a designated flight path, and/or is descending at a rapid rate of descent such that, upon impact, there is a risk of damage to an object with which the UAV may collide. Upon detecting the risk of damage and prior to impact, the damage avoidance system activates a protection system having one or more protection elements that work in concert to reduce or prevent damage to the object upon impact. Reducing and/or preventing damage to the object may, in some instances, also reduce or prevent damage to the UAV. However protecting the UAV may be of secondary consideration.

To illustrate a specific example, an UAV may be equipped with a damage avoidance system that includes a safety monitoring system and a protection system. If the UAV, for example, is descending at an uncontrolled rate, the safety monitoring system, through use of various detection elements described below, measures a distance from an approaching object and determines a velocity of the UAV toward that object. Based on the collected information, the safety monitoring system determines whether the risk of damage to the object, that will be caused by the impending impact, exceeds an acceptable threshold. If the safety monitoring system determines that the risk of damage exceeds the acceptable threshold, the protection system is activated. The protection system, in this example, causes the UAV to be reoriented, if necessary, and deploys a parachute prior to impact such that the parachute slows the rate of descent of the UAV, thereby reducing the forces at impact with the object.

In some implementations, the parachute may be deployed ballistically to speed the deployment of the parachute. For example, a mass may be tethered to the canopy of the parachute. When the mass is deployed from the UAV, it pulls the parachute from the protection element housing so that the canopy can be fully deployed in seconds. In other implementations, deployment of the parachute may be accelerated through use of a compressed gas cartridge (e.g., carbon dioxide, air), solid-fuel rocket, a cartridge containing an incompressible liquid, jets, and the like. For example, a cartridge filled with water (an incompressible liquid) may be attached to the parachute. To deploy the cartridge, a gas (e.g., air) is introduced into the cartridge causing the water to expel from the cartridge and deploy the cartridge from the UAV.

This brief introduction is provided for the reader's convenience and is not intended to limit the scope of the technology described herein. Several example implementations and contexts are provided hereinafter with reference to the following figures, as described below in more detail. However, the following implementations and contexts are but a few of many.

While the examples discussed herein primarily focus on UAVs in the form of an aerial vehicle utilizing multiple propellers to achieve flight (e.g., a quad-copter or octo-copter), it will be appreciated that the implementations discussed herein may be used with other forms of UAVs.

A "relay location," as used herein, may include, but is not limited to, a delivery location, a materials handling facility, a cellular tower, a rooftop of a building, a delivery location, or any other location where an UAV can land, charge, retrieve inventory, replace batteries, and/or receive service.

As used herein, a "materials handling facility" may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling.

A "delivery location," as used herein, refers to any location at which one or more inventory items may be delivered. For example, the delivery location may be a person's residence, a place of business, a location within a materials handling facility (e.g., packing station, inventory storage), any location where a user or inventory is located, etc. Inventory or items may be any physical goods that can be transported using an UAV.

FIG. 1A illustrates a block diagram of a top-down view of an UAV 100 with a damage avoidance system 101, according to an implementation. The damage avoidance system 101 is discussed in further detail below with respect to FIG. 1B.

As illustrated, the UAV 100 includes eight propellers 102-1, 102-2, 102-3, 102-4, 102-5, 102-6, 102-7, 102-8 spaced about the frame 104 of the UAV. The propellers 102 may be any form of propeller (e.g., graphite, carbon fiber) and of a size sufficient to lift the UAV 100 and any inventory engaged by the UAV 100 so that the UAV 100 can navigate through the air, for example, to deliver an inventory item to a location. While this example includes eight propellers, in other implementations, more or fewer propellers may be utilized. Likewise, in some implementations, the propellers may be positioned at different locations on the UAV 100. In addition, alternative methods of propulsion may be utilized. For example, fans, jets, turbojets, turbo fans, jet engines, and the like may be used to propel the UAV.

The frame 104 or body of the UAV 100 may likewise be of any suitable material, such as graphite, carbon fiber and/or aluminum. In this example, the frame 104 of the UAV 100 includes four rigid members 105-1, 105-2, 105-3, 105-4, or beams arranged in a hash pattern with the rigid members intersecting and joined at approximately perpendicular angles. In this example, rigid members 105-1 and 105-3 are arranged parallel to one another and are approximately the same length. Rigid members 105-2 and 105-4 are arranged parallel to one another, yet perpendicular to rigid members 105-1 and 105-3. Rigid members 105-2 and 105-4 are approximately the same length. In some implementations, all of the rigid members 105 may be of approximately the same length, while in other implementations, some or all of the rigid members may be of different lengths. Likewise, the spacing between the two sets of rigid members may be approximately the same or different and/or the orientation of the rigid members with respect to other rigid members and/or the frame 104 of the UAV may also vary.

While the implementation illustrated in FIG. 1A includes four rigid members 105 that are joined to form the frame 104, in other implementations, there may be fewer or more components to the frame 104. For example, rather than four rigid members, in other implementations, the frame 104 of the UAV 100 may be configured to include six rigid members. In such an example, two of the rigid members 105-2, 105-4 may be positioned parallel to one another. Rigid members 105-1, 105-3 and two additional rigid members on either side of rigid members 105-1, 105-3 may all be positioned parallel to one another and perpendicular to rigid members 105-2, 105-4. With additional rigid members, additional cavities with rigid members on all four sides may be formed by the frame 104. As discussed further below, a cavity within the frame 104 may be configured to include an inventory engagement mechanism for the engagement, transport and delivery of item(s) and/or containers that contain item(s).

In some implementations, the UAV may be configured for aerodynamics. For example, an aerodynamic housing may be included on the UAV that encloses the UAV control system 110, one or more of the rigid members 105, the frame 104 and/or other components of the UAV 100. The housing may be made of any suitable material(s), such as graphite, carbon fiber, aluminum, etc. Likewise, in some implementations, the location and/or the shape of the inventory (e.g., item or container) may be aerodynamically designed. For example, in some implementations, the inventory engagement mechanism may be configured such that, when the inventory is engaged, it is enclosed within the frame and/or housing of the UAV 100 so that no additional drag is created during transport of the inventory by the UAV 100. In other implementations, the inventory may be shaped to reduce drag and provide a more aerodynamic design of the UAV and the inventory. For example, if the inventory is a container and a portion of the container extends below the UAV when engaged, the exposed portion of the container may have a curved shape.

The propellers 102 and corresponding propeller motors are positioned at both ends of each rigid member 105. For inventory transport purposes, the propeller motors may be any form of motor capable of generating enough speed with the propellers to lift the UAV 100 and any engaged inventory thereby enabling aerial transport of the inventory. For example, for these purposes, the propeller motors may each be a FX-4006-13 740 kv multi rotor motor. As will be described in more detail below, when the propeller motors are to be utilized for electricity generation procedures, they may also be any form of motor (e.g., permanent magnet, brushless, etc.) capable of generating electricity when the propellers are turned by an airflow (e.g., from a wind or the relative movement of the UAV 100 through the air).

Extending outward from each rigid member is a support arm 106 that is connected to a safety barrier 108. In this example, the safety barrier is positioned around and attached to the UAV 100 in such a manner that the motors and propellers 102 are within the perimeter of the safety barrier 108. The safety barrier may be plastic, rubber, etc. Likewise, depending on the length of the support arms 106 and/or the length, number or positioning of the rigid members 105, the safety barrier may be round, oval, or any other shape.

Mounted to the frame 104 is the UAV control system 110. In this example, the UAV control system 110 is mounted in the middle and on top of the frame 104. The UAV control system 110, as discussed in further detail below with respect to FIG. 13, controls the operation, routing, navigation, communication, electricity generation procedures, and the inventory engagement mechanism of the UAV 100.

Likewise, the UAV 100 includes one or more power modules 112. In this example, the UAV 100 includes two power modules 112 that are removably mounted to the frame 104. The power module for the UAV may be in the form of battery power, solar power, gas power, super capacitor, fuel cell, alternative power generation source, or a combination thereof. For example, the power modules 112 may each be a 6000 mAh lithium-ion polymer battery, polymer lithium ion (Li-poly, Li-Pol, LiPo, LIP, PLI or Lip) battery. The power module(s) 112 are coupled to and provide power for the UAV control system 110 and the propeller motors.

In some implementations, one or more of the power modules may be configured such that it can be autonomously recharged, removed and/or replaced with another power module while the UAV is landed. For example, when the UAV lands at a delivery location, relay location and/or materials handling facility, the UAV may engage with a charging member at the location that will recharge the power module and/or the power module may be removed and replaced.

As mentioned above, the UAV 100 may also include an inventory engagement mechanism 114. The inventory engagement mechanism may be configured to engage and disengage items and/or containers that hold items. In this example, the inventory engagement mechanism 114 is positioned within a cavity of the frame 104 that is formed by the intersections of the rigid members 105. The inventory engagement mechanism may be positioned beneath the UAV control system 110. In implementations with additional rigid members, the UAV may include additional inventory engagement mechanisms and/or the inventory engagement mechanism 114 may be positioned in a different cavity within the frame 104. The inventory engagement mechanism may be of any size sufficient to securely engage and disengage containers that contain inventory. In other implementations, the engagement mechanism may operate as the container, containing the inventory item(s) to be delivered. The inventory engagement mechanism communicates with (via wired or wireless communication) and is controlled by the UAV control system 110.

While the implementations of the UAV discussed herein utilize propellers to achieve and maintain flight, in other implementations, the UAV may be configured in other manners. For example, the UAV may include fixed wings and/or a combination of both propellers and fixed wings. For example, the UAV may utilize one or more propellers to enable takeoff and landing and a fixed wing configuration or a combination wing and propeller configuration to sustain flight while the UAV is airborne.

Figure 1B:
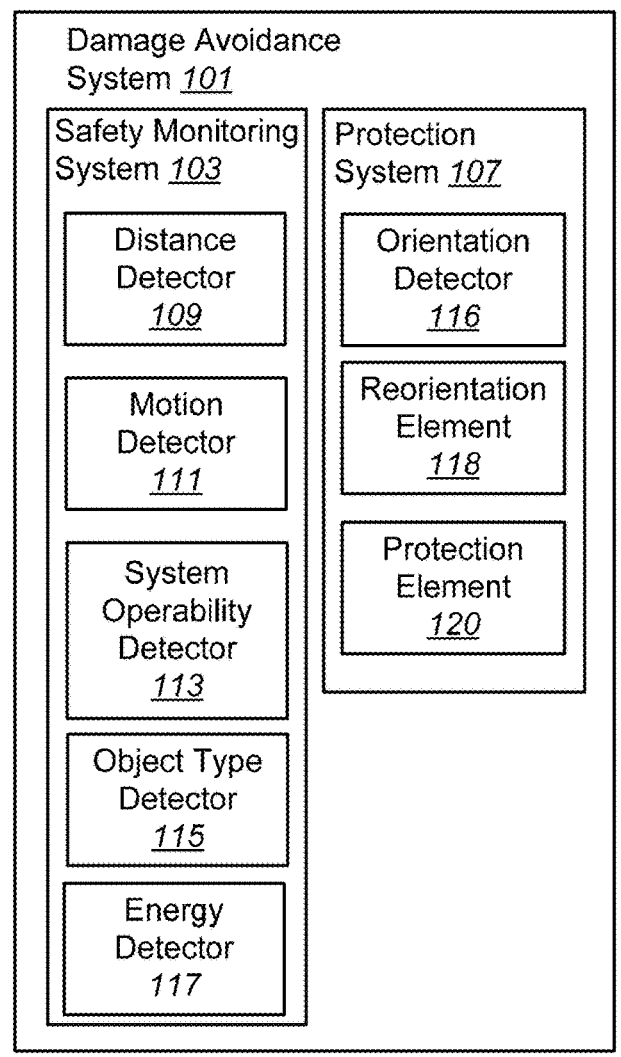
FIG. 1B depicts a block diagram of a damage avoidance system of an unmanned aerial vehicle, according to an implementation.

FIG. 1B provides additional details of the damage avoidance system 101, included in the UAV 100, according to an implementation. The damage avoidance system 101 is capable of detecting whether there is a risk of damage to an object that exceeds a damage risk threshold and taking steps to reduce or eliminate that risk.

The damage avoidance system 101 includes a safety monitoring system 103 and a protection system 107. The safety monitoring system 103 includes one or more monitoring elements that determine/measure various states and/or information related to the UAV 100. For example, the safety monitoring system 103 may include monitoring elements such as a distance detector 109, a motion detector 111, a system operability detector 113, an object type detector 115, and an energy detector 117. As will be appreciated, more or fewer monitoring elements may be included in the safety monitoring system 103.

The distance detector 109 may be any number of components that can measure/determine the distance between the UAV 100 or damage avoidance system 101 and an object (not shown), such as an animal, an automobile, a building, the ground, etc. For example, the distance detector 109 can use a sound or light generator/source (e.g., radar, sonar, laser, infra-red) in conjunction with a receptor/receiver to capture the reflection of the generated sound or light wave to determine/calculate the distance between UAV 100 and the object. In some implementations, the distance detector 109 periodically measures/determines a distance between the UAV 100 and objects. In other implementations, the distance detector 109 continuously measures a distance between the UAV 100 and nearby objects to maintain a relative altitude of the UAV above those objects. The distance detector 109 may be disabled until a triggering event occurs or, alternatively, may always be enabled. A triggering event may be any scenario in which the UAV may unintentionally collide with an object. For example, a triggering event may be determined if one or more of the detectors of the safety monitoring system 103 collects data and determines that the UAV 100 is descending at an uncontrolled rate. Likewise, a triggering event may be determined if the system operability detector 113 collects data and determines that the UAV control system is not functioning properly (e.g., the UAV is not following an intended flight path or not responding to control instructions) and/or has lost power.

The motion detector 111 measures/determines movement of the UAV 100. For example, the motion detector 111 may measure acceleration or motion of the UAV 100. The motion detector 111 may include, for example, an accelerometer or any type of motion detection device. In some implementations, the motion detector 111 may receive input data from components, such as an accelerometer and/or the distance detector 109, and calculate a velocity of the UAV 100 and/or a rate of descent of the UAV 100 based at least in part on the received input data. Alternatively, the motion detector 111 can use existing circuit(s) of the UAV 100, components of the UAV control system 110 (FIG. 13), and/or dedicated elements in communication with the motion detector 111 to collect data and determine the velocity of the UAV 100. For example, the navigation system 1308 of the UAV control system 110 may provide altitude information, velocity, etc., that are used by the motion detector 111 to determine a rate of descent of the UAV 100. The motion detector 111 may also include a sound or light generator/source in conjunction with a detector/receiver to capture the reflection of a generated sound or light wave to calculate the velocity of UAV 100.

The system operability detector 113 is configured to monitor the operability of the UAV 100 and/or components of the UAV, such as the UAV control system 110. For example, the system operability detector 113 may monitor the position of the UAV 100 to ensure that is following the flight path 1326 specified by the UAV control system 110. Likewise, the system operability detector 113 may also monitor for power interruptions, loss of communication, rotational speed of the propellers and/or propeller motors, etc.

The object type detector 115 may determine the type of object that the UAV 100 is approaching when moving toward an object. For example, the object type detector 115 may measure whether the object is a solid, hard object (e.g., concrete, soil, building), a softer object (e.g., tree, water, snow), an animate object (e.g., animal), an inanimate object (e.g., building, automobile), or the like. It may be determined that an object is animate by using a thermal sensor to detect heat generated by the object.

The object type detector 115 may also determine the relative value and/or ability of the object to absorb or reflect the energy from the impact of the UAV 100 and the object. The relative value may be measured or identified as a hardness or firmness of the object. The object type detector 115 may use a number of technologies, such as infra-red, radar, x-ray or image recognition, to perform the determination of the object type. For example, using image recognition, the UAV 100 may include a camera and image recognition software. The camera can capture images of the object and, using image recognition techniques, the type of object may be determined. As discussed below, the damage avoidance system 101 may use the object type in determining whether the risk of damage to the object exceeds a damage risk threshold (in consideration with data from the other components of the safety monitoring system 103) and/or to select one or more protection elements to deploy.

The energy detector 117 may determine the amount of kinetic energy at an impact with the object and determine if the amount of energy exceeds a defined threshold. For example, the energy detector may receive information identifying the relative altitude (height) of the UAV and determine the kinetic energy of the UAV 100 at impact. For example, if the UAV 100 is 100 meters (h) above the object and loses power such that it begins a free-fall from that height, the velocity (v) of the UAV 100 just before impact will be approximately 44.27 meters/second ($v=\sqrt{2gh}$, where g is gravity (9.81 m/s$^2$)). If the mass of the UAV 100 is 25 kilograms, the kinetic energy just before impact will be 24,500 joules, which will be approximately equal to the force at impact, depending on the object and its ability to absorb the impact without damage to the object. The calculated force at impact and/or kinetic energy at impact may be used to determine the likelihood of damage to an object with which the UAV may collide.

Based on the various data/information provided from the safety monitoring system 103, the damage avoidance system 101 determines if the risk of damage to the object exceeds a damage risk threshold. The damage risk threshold may vary according to particular needs, different determined object types, etc. In some implementations, the damage risk threshold may be exceeded if the distance measured between the object and the UAV 100 is such that a possible impact from an uncontrolled or degraded flight of the UAV may damage the object. In other implementations, the damage risk threshold may be exceeded if the safety monitoring system 103 measures that the rate of descent of the UAV 100 exceeds a predetermined velocity. As another example, the damage risk threshold may be exceeded if the calculated kinetic energy at impact and/or the calculated force at impact exceeds a defined threshold. As still another example, if the object type is determined to be an animal, the damage risk threshold may be exceeded. Any combination of measurements, UAV specifications, calculations and/or durability test information may be used by the damage avoidance system 101 to determine whether the damage threshold has been, will be, or is predicted to be exceeded.

If the damage risk threshold is exceeded, the damage avoidance system 101 activates the protection system 107, described below, which takes steps to reduce or substantially eliminate the damage to the object that would otherwise potentially be caused at impact.

In addition to determining whether a risk of damage exceeds a damage risk threshold, the damage avoidance system 101 may utilize measurements from the safety monitoring system 103 (e.g., distance, velocity, acceleration) to calculate and/or predict a time remaining until impact with the object. The time remaining until impact may be used by the protection system 107 to determine whether and/or when the reorientation element 118 and/or the protection element 120 should be activated. For example, if the protection element is a parachute and the measured orientation, motion and time until impact are such that the device will be oriented with the protection element 120 positioned upward and away from the object in time for deployment before impact, the protection system 107 may not activate the reorientation element 118. However, if the data measurements indicate that the UAV 100 will not be reoriented in time to deploy the protection element 120, the protection system 107 may activate the reorientation element 118 at a specific time, based on the measurements, so that the UAV 100 is reoriented such that a side with a protection element 120 will be properly oriented with sufficient time to deploy the protection element 120 and slow the rate of descent of the UAV 100.

The protection system 107 may include any number of components that work to reduce or eliminate the detected risk of damage to the object. For example, the protection system 107 may include an orientation detector 116, a reorientation element 118 and a protection element 120. The orientation detector 116 may be a stand-alone component or combination of components that are designed to detect the orientation of the UAV 100. For example, devices such as accelerometers or tilt sensors could be used. As another example, orientation detector 116 may be a camera associated with the UAV 100. For example, the camera can be located on the top, bottom and/or sides of the UAV 100. The camera may be used to determine whether the protection element 120 is oriented toward or away from the object. As described below, this information may help the protection system 107 determine what actions to take so that the UAV 100 will be in a desired orientation at impact with the object and/or when the protection element 120 is deployed.

The reorientation element 118 may be any number of elements that can alter the orientation of the UAV 100. In general, the reorientation element 118 may produce a force, alter a physical property or otherwise create a change in and/or alter the orientation of the UAV 100. As discussed below with respect to FIGS. 7-9B, examples of the reorientation element 118 may be a gas expelled from a compressed gas cartridge, an incompressible liquid (e.g., water) expelled from a cartridge, a rotational modifier, a movable weight or other types of devices that can cause reorientation of the UAV 100, etc. An example reorientation technique using a movable weight may be to relocate the position of the power module 112 to alter or create a rotation of UAV 100. Yet another technique may be to utilize actuators to cause vibrations in the UAV 100 that cause UAV 100 to rotate in a desired direction. These techniques may be used alone or in conjunction with each other. Other techniques may be readily apparent to a person skilled in the relevant art. In one implementation, reorientation element 118 and protection element 120 can be combined into a single element. For example, the same propulsion elements can be used to alter the device orientation as well as deploy the protection element 120, such as a parachute.

The protection element 120 may be any number of elements that help protect an object from damage due to impact by the UAV. In general, the protection element 120 acts to absorb or alter the energy that would otherwise transfer to the object as a result of a collision between the object and the UAV. The protection element 120 may be an energy-absorbing material, a material that allows the kinetic energy of UAV 100 to be dissipated over a greater time or area, a material that reduces the kinetic energy of UAV 100 or other appropriate materials. As discussed below with respect to FIGS. 2A-6, examples of the protection element 120 may be one or more of a parachute, an airbag, a propulsion element, a spring, and an impact absorbing structure, among others.

In some implementations, the damage avoidance system 101 may utilize the power module 112 of the UAV 100. In other implementations, the damage avoidance system 101 may include and/or utilize its own power module and/or have a backup power module available in the event the power module 112 of the UAV is inoperable.

In some implementations, the damage avoidance system 101 may be configured to utilize the propellers of the UAV to generate electricity that is stored in one or more storage components (e.g., capacitors, batteries) and which may be used to initiate damage protection and/or deploy a protection element, as discussed further below with respect to FIGS. 1C and 1D.

In some implementations, the damage avoidance system 101 may be configured to isolate or destroy the power module 112 prior to impact with the object so that the power module 112 does not potentially ignite or explode at impact. For example, if the protection system 107 is activated and it is determined that the UAV is high enough that the power module can be isolated prior to impact, the protection system 107 may short circuit the power module (e.g., by penetrating the wall of the power module), causing it to deplete its energy prior to impact.

Figure 1C:
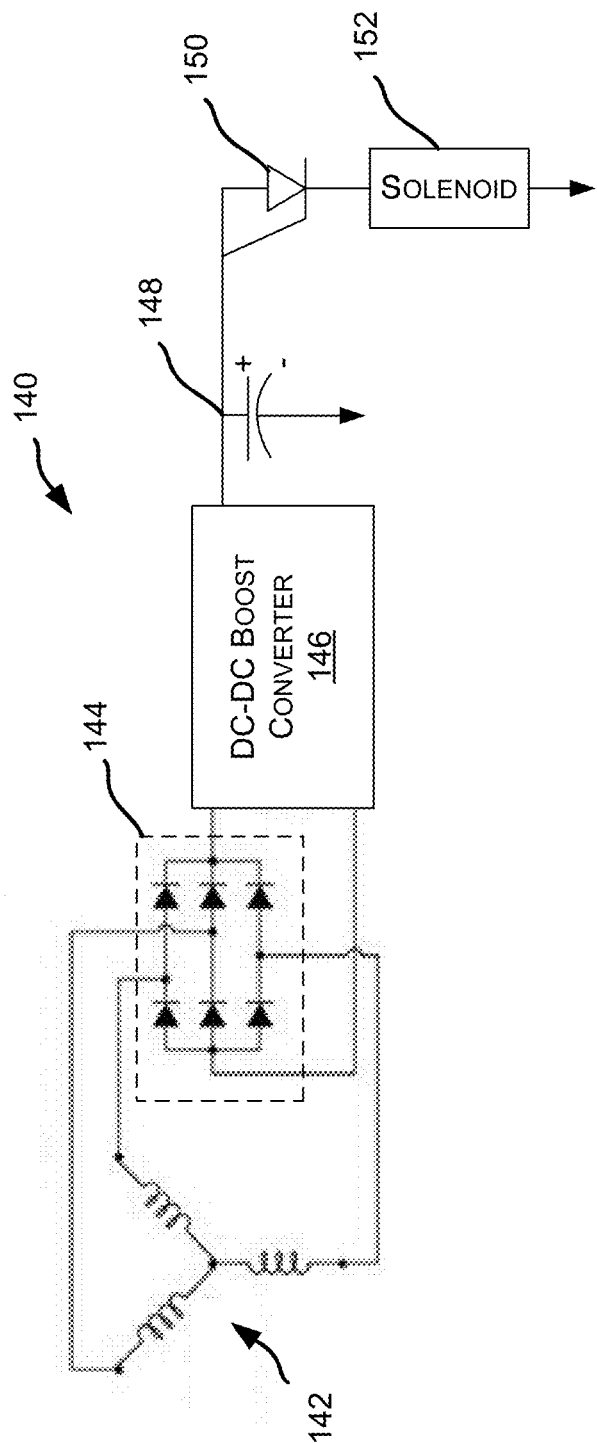
FIGS. 1C and 1D are circuit diagrams illustrating example deployment circuits for deploying the protection element 120, according to an implementation.
Figure 1D:
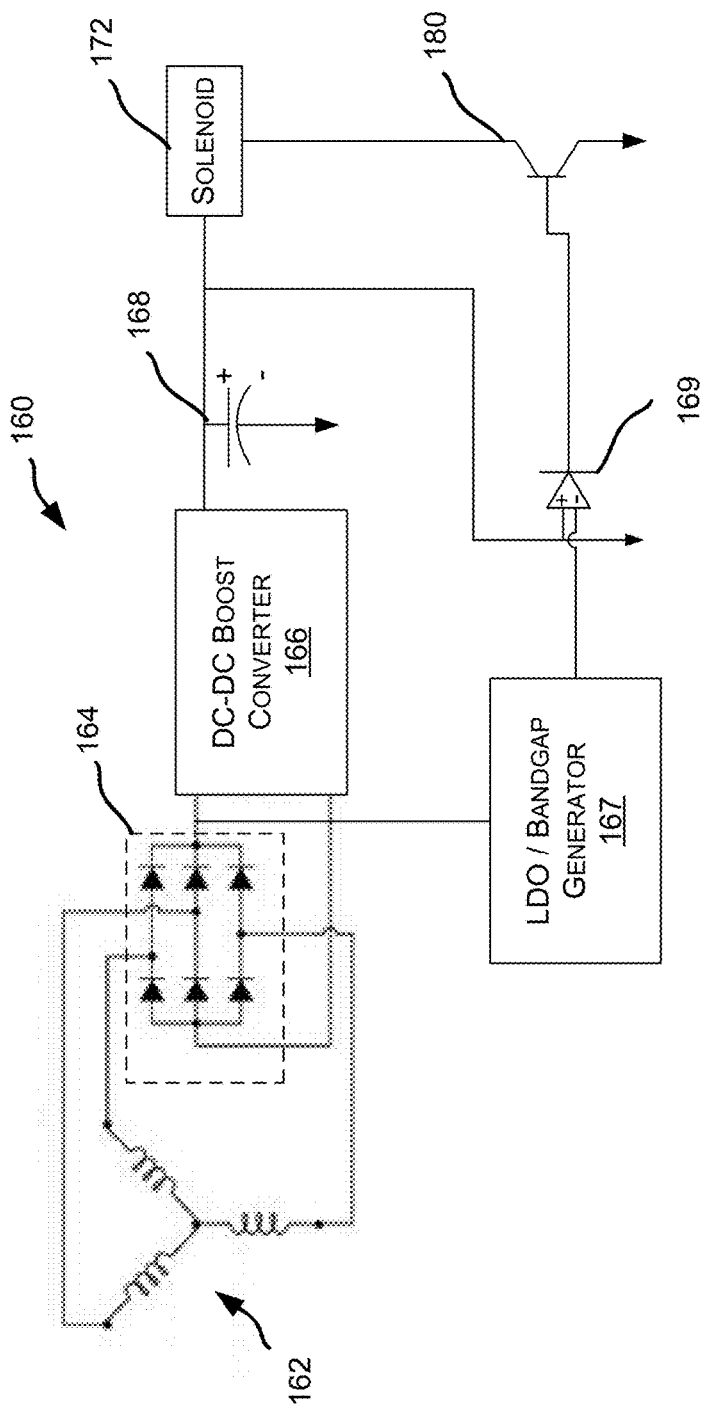

FIGS. 1C and 1D are circuit diagrams illustrating example deployment circuits for deploying the protection element 120, according to an implementation. If the UAV is rapidly descending toward an object, the propellers may be allowed to freely rotate as the airflow from the descent passes the blades of the propellers and the propeller motors may be operated as generators. The free rotation of the propellers will cause the rotor of the motor to rotate around the stator of the motor. The electromagnets of the stator of the motor will generate alternating current (AC) in response to the permanent magnets of the rotor rotating around the stator. The deployment circuit 140 may be coupled to the motor, represented as the three-phase AC source 142 (FIG. 1C).

In the illustrated example, the three-phase AC source 142 (motor) is coupled to a three-phase rectifier 144 that converts the AC to direct current (DC). The resulting DC may be provided to a DC-DC boost converter 146 that increases the source voltage and reduces the source current. The output from the DC-DC boost converter 146 is used to charge one or more capacitors 148. The one or more capacitors are coupled to a silicon-controlled rectifier (SCR) 150. The SCR 150 provides a trigger or gate for energizing a solenoid 152. When the one or more capacitors 148 become fully charged, the voltage rise on the gate of the SCR will cause the SCR to latch, thereby discharging the one or more capacitors 148 into and activating the solenoid 152. The solenoid is then used to discharge the protection element 120.

FIG. 1D illustrates an alternative deployment circuit 160 for deploying a protection element 120, according to an implementation. Similar to the deployment circuit 140, the AC from the motor, represented as the three-phase AC source 162, is provided to a three-phase rectifier 164 and the resulting DC voltage is stepped-up with a DC-DC boost converter 166 to charge one or more capacitors 168. In this example, rather than utilizing a SCR to control the triggering of the solenoid, the output of the three-phase rectifier 164 is coupled to a low-dropout (LDO)/bandgap generator 167 that provides a reference voltage to a change comparator 169. The change comparator 169 compares the reference voltage from the LDO/bandgap generator 167 with the output from the one or more capacitors 168. When the one or more capacitors 168 become fully charged, the output voltage increases causing the change comparator 169 to activate and provide current to the base of a bipolar junction (BJT) transistor 180. The current to the base of the BJT 180 causes the BJT transistor 180 to become active, which results in the capacitor 168 discharging into the solenoid 172, which discharges the protection element 120.

Utilizing a deployment circuit, such as the ones illustrated in FIGS. 1C and 1D, there is no need for a power module and/or the damage avoidance system. Alternatively, such a configuration may be utilized as yet another backup for protecting the UAV from damage. For example, the damage avoidance system 101 may be configured as discussed herein and the configuration of automatically deploying the protection element when a capacitor(s) fully charges may be utilized as a backup protection system in the event the damage avoidance system is inoperable.

While the example deployment circuits 140, 160 utilize one or more capacitors, in other implementations other components (e.g., batteries) may be used. Likewise, the solenoid may be a mechanical solenoid that is used to activate the discharge element (e.g., gas/liquid chamber, propellant) and deploy the protection element. In other implementations, the solenoid may be configured to electrically ignite a discharge element and cause the deployment of the protection element 120.

To control activation of a deployment circuit 140, 160, the connection between the deployment circuit and the motor may be selectively enabled. For example, a hall sensor (not shown) may be used to monitor the direction of rotation of the motor (and thus the propellers). When the motor is rotating in response to the motor driving the rotation of the propellers in a first direction the deployment circuit is decoupled from the motor. However, when the hall sensor detects that the motor is rotating in a second direction, the deployment circuit is connected and current generated by the free rotation of the propellers in the second direction is provided to the deployment circuit. In other implementations, any one of a passive resistor-capacitor (RC) discharge circuit may be utilized that is triggered upon exceeding the duration of the first order discharge transient of the RC discharge circuit, a single impulse/trigger LiPo voltage monitor, a low-power inertial-measurement unit (IMU) data board, the system operability detector 113, the energy detector 117, etc., may be used to activate and/or deactivate a deployment circuit, such as the deployment circuits 140, 160 discussed herein.

Figure 2A:
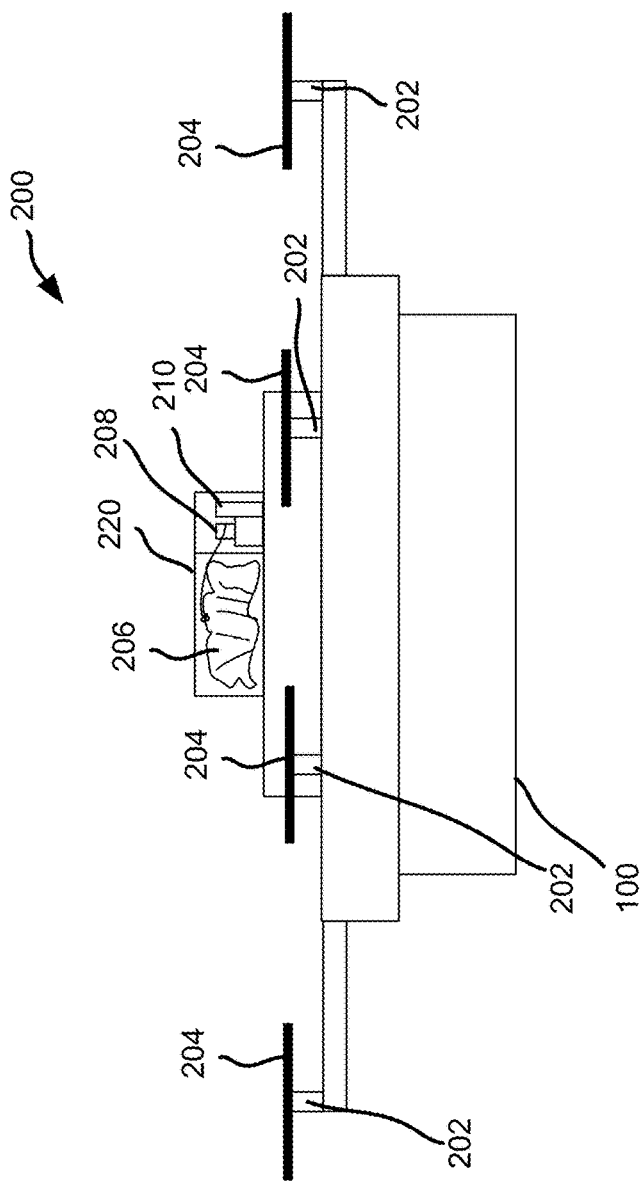
FIGS. 2A-2C depict block diagrams of a side view of an unmanned aerial vehicle, according to an implementation.

FIG. 2A depicts a block diagram of a side view 200 of an UAV 100, according to an implementation. In the side view of the UAV illustrated in FIG. 2A, four motors 202 and propellers 204 are visible. In other implementations, additional or fewer motors 202 and/or propellers 204 may be included in the UAV 100. In this example, the motors 202 may all be mounted at 90 degrees with respect to the UAV 100. In an alternative implementation, the mountings of the motors may be adjustable and/or at different angles.

Figure 2B:
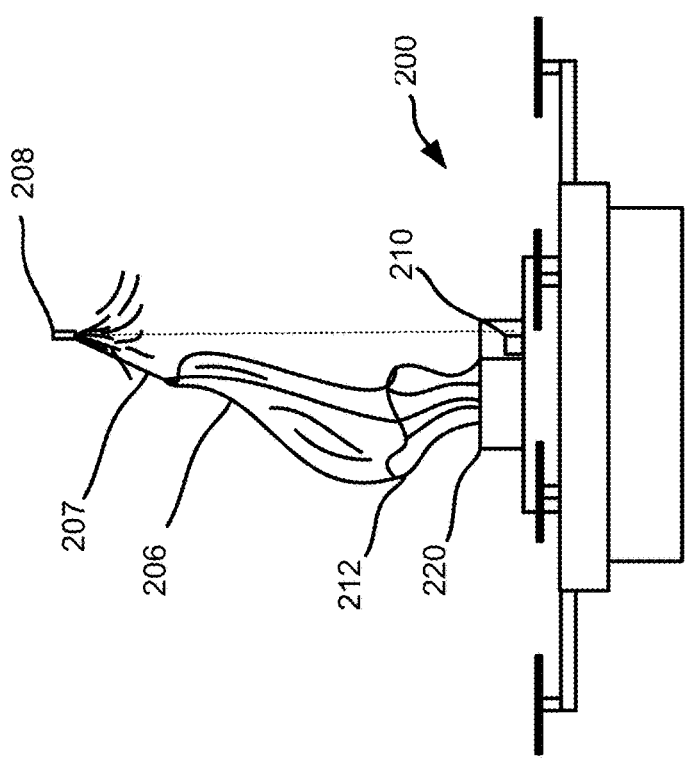

Mounted to the top, or upper surface of the UAV 100 is a protection element 220. In this implementation, the protection element 220 includes a parachute 206 that may be deployed when the risk of damage to an object exceeds a damage threshold. To speed deployment of the parachute, the parachute may be coupled to a deployment projectile 208. For example, the deployment projectile 208 may be a mass that is coupled to the top of the canopy of the parachute 206, for example, with a tether or other cord. When the deployment projectile 208 is deployed, as illustrated in FIG. 2B, it pulls the parachute 206 from the protection element 220 housing until the suspension lines 212 of the parachute 206 are taut, thereby increasing the speed at which the canopy of the parachute 206 will fill with air, which will, in turn, slow the rate of descent of the UAV 100 and reduce the potential of damage to an object with which the UAV may impact. The deployment projectile 208 may be discharged from the UAV 100 by igniting or releasing a propellant 210, such as gun powder, compressed gas (e.g., carbon dioxide, air), compressed water, solid-fuel rockets, etc. The propellant 210 may be electrically ignited by the damage avoidance system. For example, a deployment circuit, such as the ones discussed above with respect to FIGS. 1C and 1D may be used to ignite the propellant 210. In other implementations, the deployment projectile may be deployed mechanically through use of a solenoid, a spring, etc.

In some implementations, the propellant 210 and/or the container that contains the propellant may be utilized as the deployment projectile 208. For example, the protection element 220 may include a gas or liquid cartridge that is attached to a top of the parachute 206 canopy with a tether 207 and oriented such that the cartridge will deploy from the UAV 100 when discharged. The force of the deployment and the weight of the cartridge will pull the parachute 206 from the protection element 220 housing until the suspension lines 212 of the parachute 206 are taut and the canopy can fill with air. In another example, a solid-fuel rocket may be configured to operate as both the propellant 210 and the deployment projectile 208.

In some implementations, the protection element 220 of the UAV 100 may include one parachute. In other implementations, multiple parachutes may be mounted on the same and/or different sides of the UAV 100. If there are multiple parachutes coupled to the same side of the UAV 100, they may all be configured to deploy if the risk of damage to the UAV exceeds a threshold. In comparison, in some implementations, there may be one or more parachutes and corresponding deployment projectiles mounted to the top of the UAV, one or more parachutes and corresponding deployment projectiles mounted to the bottom of the UAV, and/or one or more parachutes and corresponding deployment projectiles mounted to each of the sides of the UAV. In such an implementation, rather than attempting to re-orient the UAV to enable deployment of the parachute from the top of the UAV 100, the orientation of the UAV may be determined and the appropriate parachute(s) deployed.

In some implementations, the orientation of the deployment of a parachute may also be adjusted. For example, the orientation of the UAV 100 may be determined, a parachute selected, and the orientation of the parachute and/or a deployment projectile coupled to the parachute may be adjusted so that it is deployed in an appropriate direction with respect to the object. Alternatively, or in addition thereto, a parachute may be attached to multiple deployment projectiles oriented in different directions. In such an implementation, a deployment projectile may be determined and deployed based on the orientation of the UAV 100.

In some implementations, rather than or in addition to utilizing a deployment projectile to deploy the parachute, the parachute 206 may include one or more weights (not shown) secured around the perimeter of the canopy near the junction between the canopy and the suspension lines. To deploy the parachute 206, the damage avoidance system 101 may cause the UAV 100 to rotate or alter its yaw at a rate sufficient to generate enough centrifugal force on the weights to cause deployment of the parachute 206 from the protection element 220. The centrifugal force pulling the weights from the protection element will aid in rapid deployment of the parachute by opening the canopy and allowing it to quickly fill with air, thereby slowing the rate of the descent of the UAV 100.

In some implementations, the protection element 220 may include sides that form a cavity into which the parachute 206 is stored when not in use. In implementations that utilize perimeter weights and centrifugal force to deploy the parachute 206 from the protection element 220, the sides of the protection element 220 may be angled outward to aid in the deployment of the weights by allowing the weights to slide up the interior of the angled sides as the UAV 100 rotates. In other implementations, the sides may be configured to break or rotate out of the way when the parachute is to be deployed. Likewise, if the protection element 220 includes a top, the top may be removed, rotated or otherwise discharged to allow the parachute 206 to deploy.

Figure 2C:
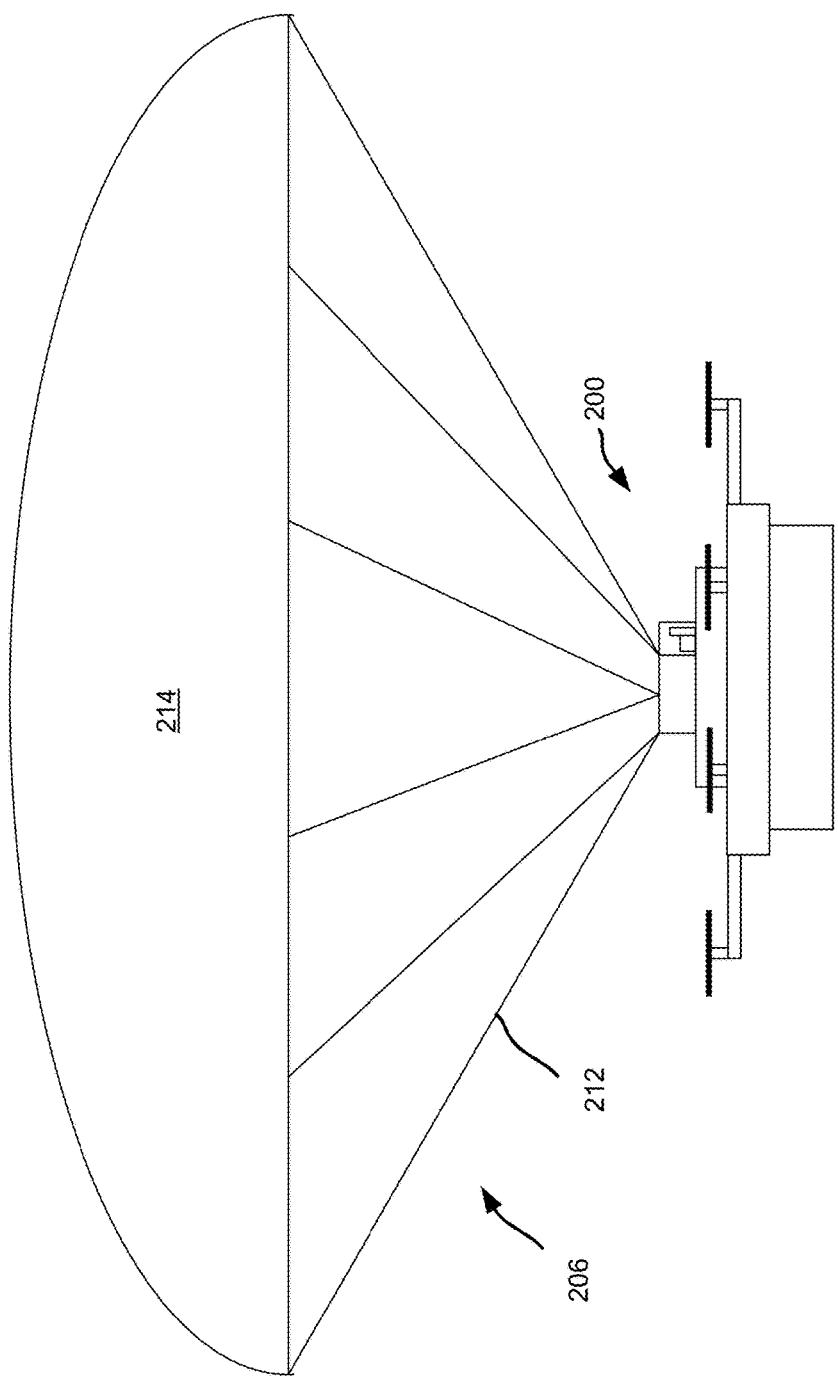

FIG. 2C depicts a block diagram of a side view 200 of the UAV 100 with a protection element deployed, according to an implementation. Continuing with the above example, the protection element is a parachute 206 that has deployed from the UAV to slow the rate of descent of the UAV 100. By deploying the parachute using a deployment projectile, the suspension lines 212 quickly become taut and the canopy 214 of the parachute 206 will quickly expand and fill with air, thereby slowing the rate of descent of the UAV.

In some implementations, as an alternative or in addition to a parachute, the protection element 220 may include an expandable membrane (e.g., balloon). In such an implementation, rather than utilizing a deployment projectile and a propellant, the protection element 220 may include a gas chamber that includes a gas, such as hydrogen or helium, that is lighter than air that can be used to fill the expandable membrane, thereby deploying it from the protection element and slowing or stopping the rate of descent of the UAV 100. The flexible membrane may be any of a variety of materials including, but not limited to, rubber, latex, polychloroprene, a nylon fabric, etc. When the risk of damage to an object exceeds the damage risk threshold, the gas chamber is released and the gas fills the flexible membrane.

Figure 3A:
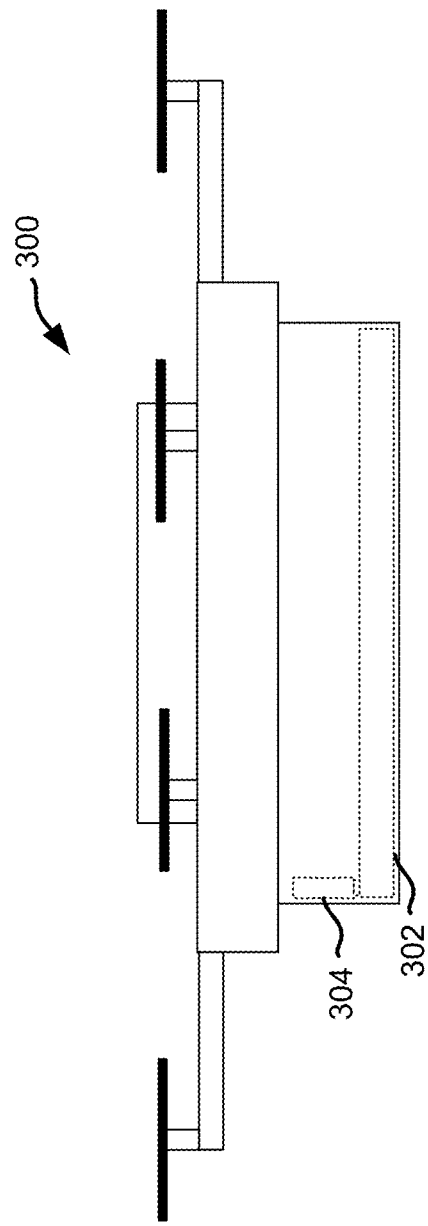
FIGS. 3A-3B depict block diagrams of another side view of an unmanned aerial vehicle, according to an implementation.

FIGS. 3A-6 illustrate various other implementations of the protection element 120 (FIG. 1B). FIG. 3A illustrates an implementation of a protection element 120 of the UAV 300 having an airbag 302. A deflated airbag 302 may be embedded into the UAV 300. The airbag 302 may be coupled to a compressed gas cartridge 304. Upon detection by the damage avoidance system 101 that the risk of damage to an object exceeds a damage risk threshold, the protection system 107 may cause the airbag 302 to deploy out of atop, bottom, and/or side of the UAV 300 prior to impact with the object. The airbag 302 may be inflated by the compressed gas cartridge 304. For example, the gas cartridge may be a compressed air or carbon dioxide cartridge. In certain implementations, the airbag 302 may be deployable from multiple sides of the UAV 300. Thus, the airbag 302 can be deployed from the side of the UAV 300 that is expected to impact the object. Alternatively, there may be multiple airbags 302 that are deployable to cover all or some of the UAV 300. In general, the airbag 302 should deploy at least on a side that will potentially impact the object first.

Figure 3B:
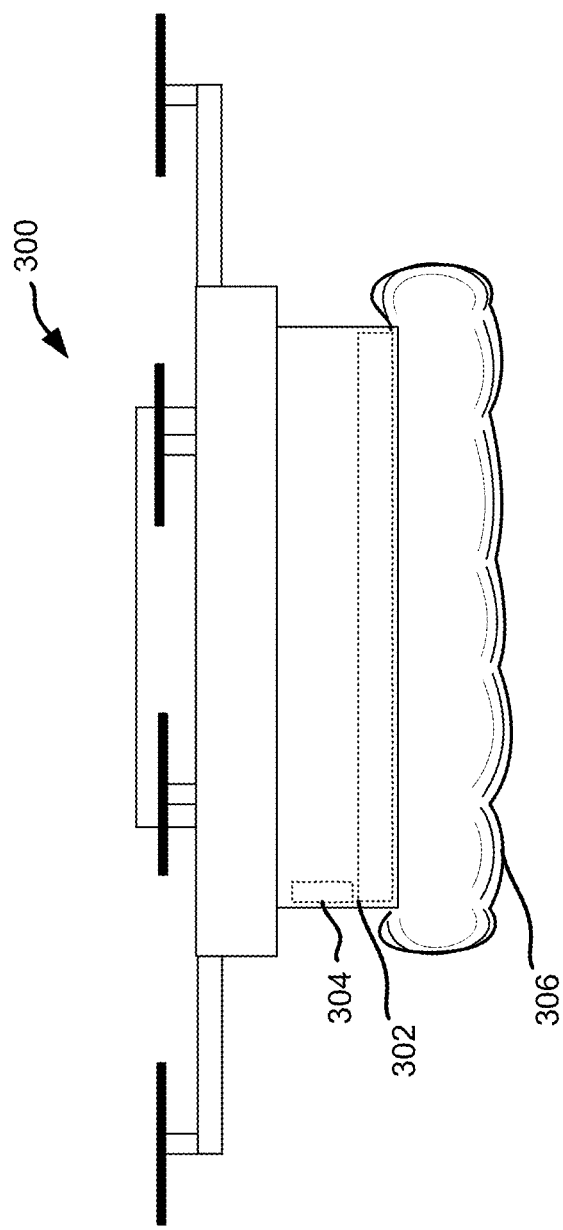

FIG. 3B illustrates an implementation of the UAV 300 in which the airbag 302 has been deployed as an inflated airbag 306. FIG. 3B shows the inflated airbag 306 along the bottom surface of the UAV 300. The inflated airbag 306 provides a cushion along the bottom surface of the UAV 300 such that upon impact, the inflated airbag 306 reduces (or eliminates) the energy transferred to the object, thereby reducing or eliminating any damage to the object. The airbag may, in some implementations, be deployed from another surface of the UAV 300 (as well as more than one surface).

Figure 4A:
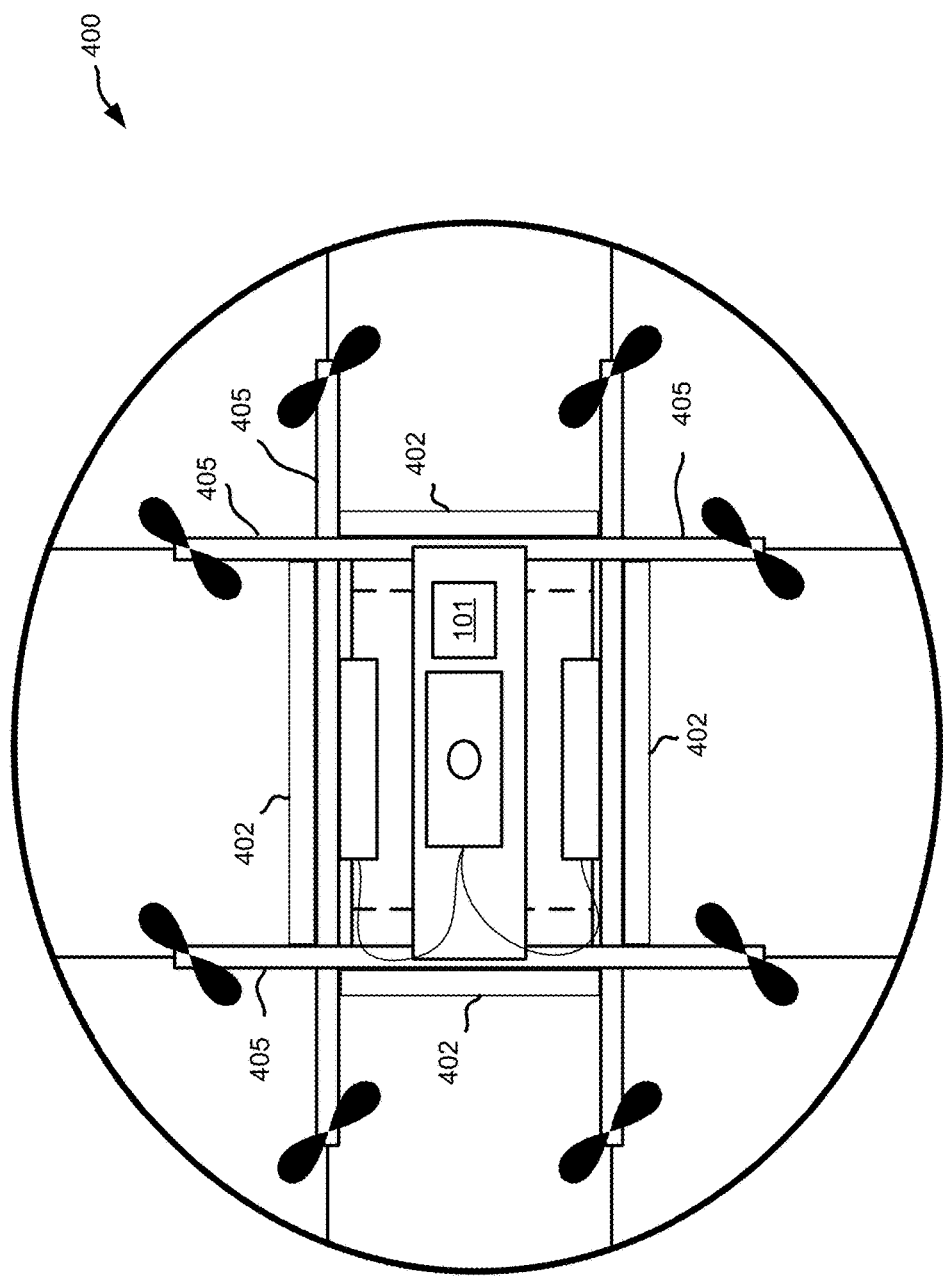
FIGS. 4A-4B depict block diagrams of a top-down view of an unmanned aerial vehicle with a damage avoidance system, according to an implementation.

FIG. 4A illustrates an implementation of a protection element 120 of the UAV 400 having deployable air deflectors 402, or sails. In FIG. 4A, the air deflectors 402 are in a retracted position. The air deflectors 402 may be fabricated of a flexible material, such as nylon, cloth, rubber, etc., and rolled or folded into a retracted position. The air deflectors 402 may be coupled to a rail or guidance mechanism that can move along the rigid members 405 to extend the air deflector 402. For example, upon detection by the damage avoidance system 101 that the risk of damage exceeds a damage threshold, the protection system 107 may cause the air deflectors 402 to deploy prior to impact. As illustrated, the air deflectors 402 may be located at multiple positions on the UAV 400.

Figure 4B:
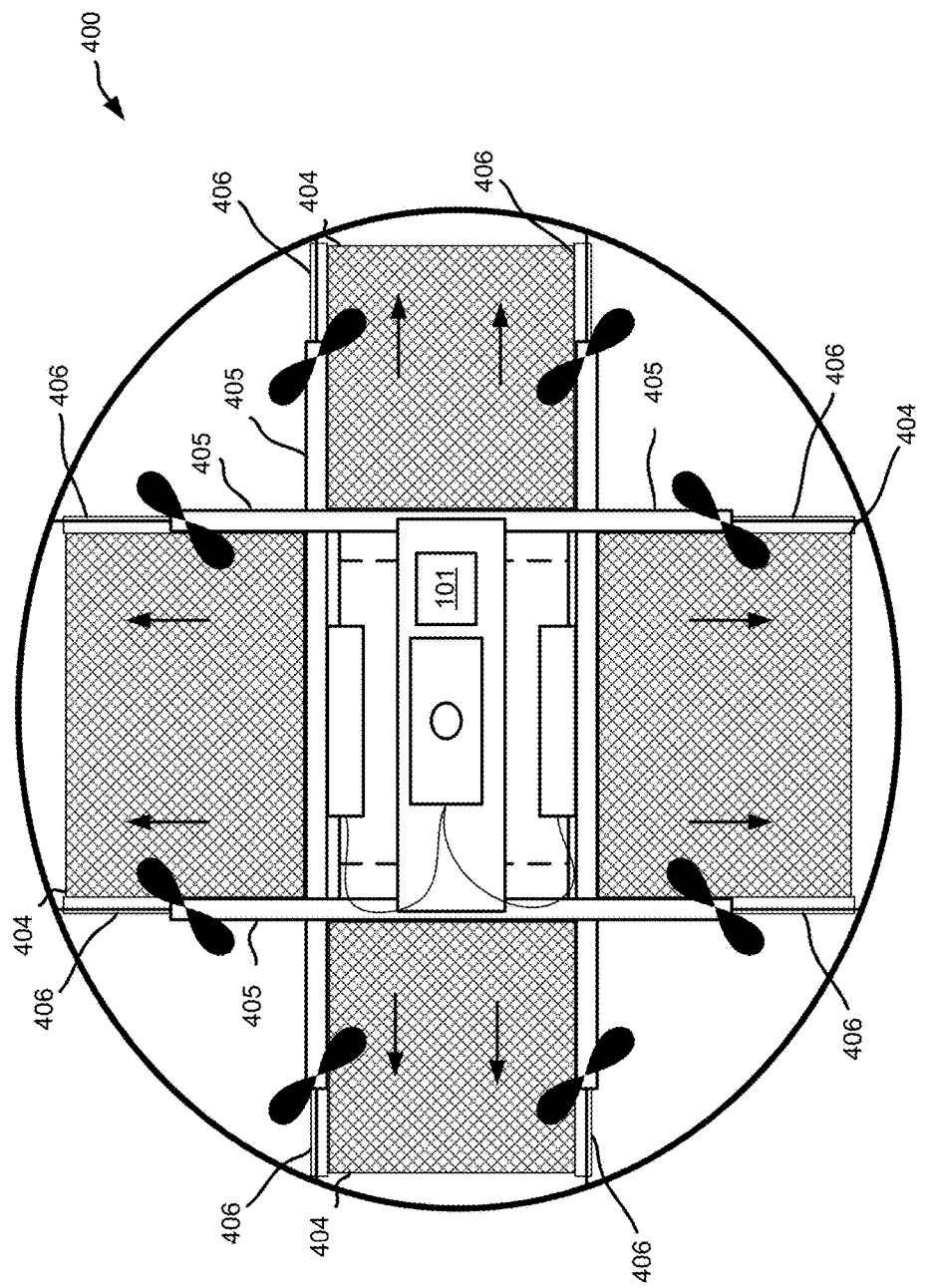

FIG. 4B illustrates an implementation of the UAV 400 in which the air deflectors 402 have been deployed as air deflectors 404. The expanded air deflectors 404 provide air resistance to slow the rate of descent of the UAV, thereby reducing the force at impact. The air deflectors 404 may be deployed by moving an extension arm 406 along a rail that is coupled to the rigid members 405. The extension arm may be moved by a motor that pushes/pulls the extension arm 406 along the rails. Alternatively, or in addition thereto, the UAV 400 may rotate or alter its yaw at a rate sufficient to cause deployment of the air deflectors 404 from the forces created by the rotation.

Figure 5:
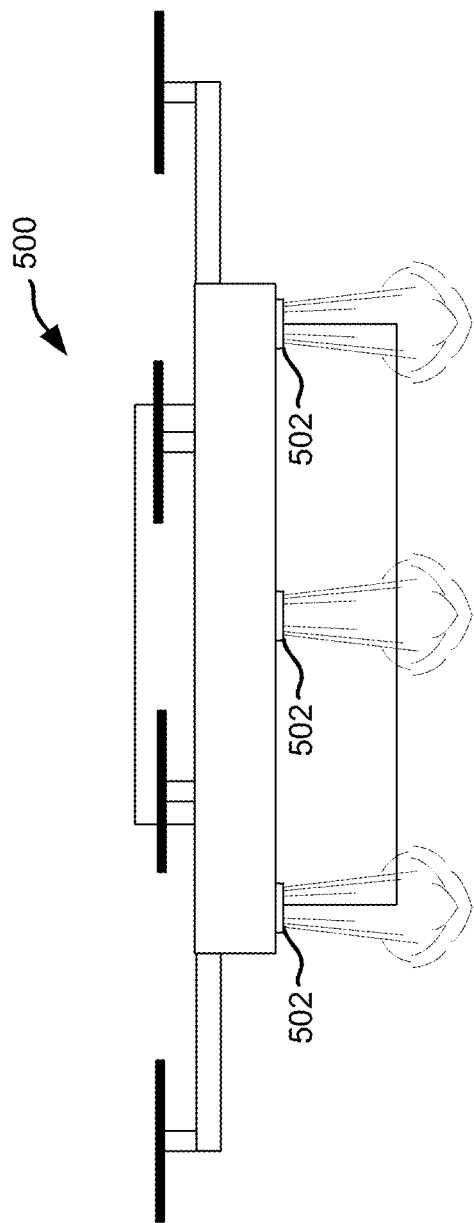
FIG. 5 depicts another block diagram of a side view of an unmanned aerial vehicle, according to an implementation.

FIG. 5 illustrates an implementation of an UAV 500 having a protection element 120 that includes one or more propulsion elements 502. Propulsion elements 502 may operate to propel and/or expel a gas from the UAV 500 to reduce the speed of the UAV 500 as it travels toward an object. A compressed gas cartridge, as described above, may be used as a source for the gas.

Figure 6:
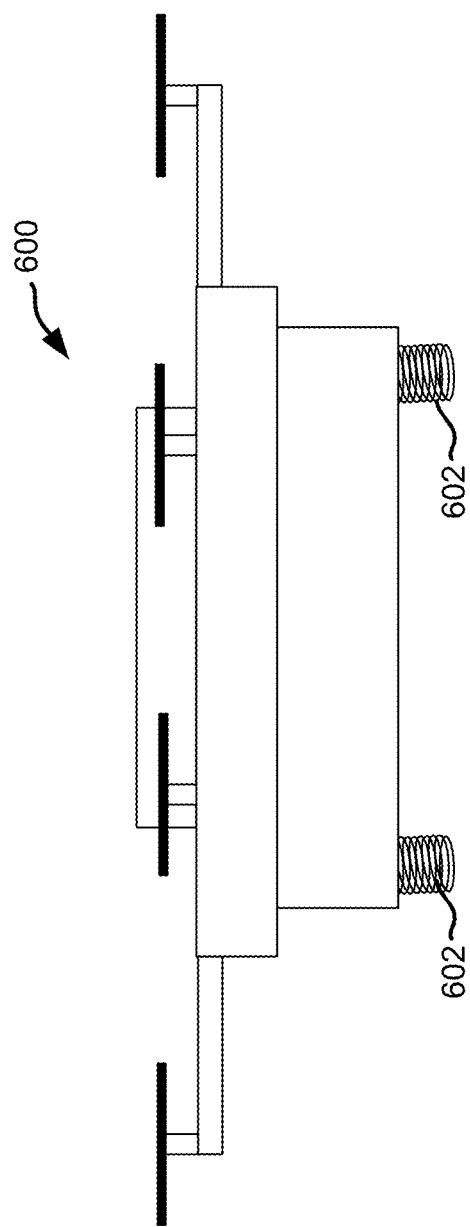
FIG. 6 depicts another block diagram of a side view of an unmanned aerial vehicle, according to an implementation.

FIG. 6 illustrates an implementation of the UAV 600 having an implementation of the protection element 120 that includes one or more springs 602. In one instance, one or more springs 602 are deployable from one or more side(s) or face(s) of the UAV 600 prior to impact in order to absorb at least a portion of the impact energy to minimize or prevent damage to the object. In such an implementation, the UAV 600 may be reoriented prior to impact such that deployed springs 602 are substantially perpendicular relative to the object with which the impact may occur. In some implementations, one or more springs 602 may be located within the body of the UAV 600 such that a portion of the housing of the UAV 600 is physically separated from at least some of the internal components within the UAV 600 prior to impact. This way, upon impact, the housing of the UAV first impacts the object. As a result, the housing of the UAV, in combination with the spring(s) 602, prevents the impact energy from transferring to the internal components of the UAV and reduces the forces transferred to the object.

Figure 7:
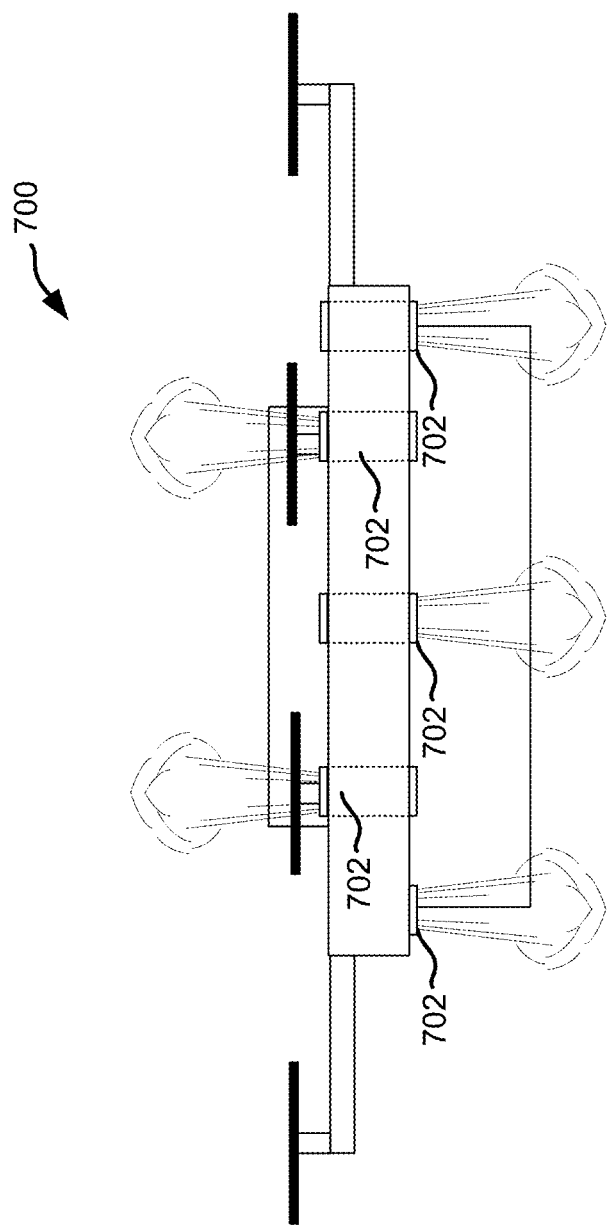
FIG. 7 depicts another block diagram of a side view of an unmanned aerial vehicle, according to an implementation.

FIG. 7 illustrates an implementation of an UAV 700 wherein the reorientation element 118 (FIG. 1B) includes one or more openings 702 in the UAV 700. The UAV 700 may have more or fewer openings 702 than shown in FIG. 7. The openings 702 may extend completely through the UAV 700 or extend only part-way through the UAV 700. The openings 702 may also be modifiable (e.g., a valve), fixed or any combination of modifiable and fixed openings.

In some implementations, the openings 702 may be used to reorient the UAV 700 while it is descending. The openings 702 may also provide the UAV 700 with the ability to alter its angular momentum to either increase or decrease its rate of rotation. As will be discussed in more detail below, altering the rate of rotation of the UAV 700 may allow protection element 120 (FIG. 1B) to be in a position to protect an object from damage caused by impact.

As an example of using openings 702 as a reorientation element 118, the openings 702 in the UAV 700 may comprise a propulsion element to allow gas to be forced through the openings 702 in order to impart an additional force to alter the orientation of the UAV 700. In this implementation, the openings 702 travel part-way through the UAV 700 so that the gas can be expelled from a side or selectable portion of the UAV 700. For example, the UAV 700 may include one or more compressed gas cartridges (not shown) and valves (not shown) that may be used to control from which openings 702 the gas is expelled and the rate of expulsion from each cartridge. By selectively expelling gas through certain openings 702 and controlling the rate of gas expelled from each opening, the angular momentum of the UAV 700 can be altered. The gas can be used to increase or decrease the rate of rotation of the UAV 700 so that, at the point of impact with the object, the UAV 700 is oriented so that a side with a protection element 120 first impacts the object. As depicted in FIG. 7, gas can be forced through one opening 702 on one side (e.g., top) of the UAV 700, and gas can be forced through another opening 702 on the opposite side (e.g., bottom) of the UAV 700. This allows extra force to increase or decrease the rate of rotation of the UAV 700. In some implementations, the openings 702 may be adjustable in order to expel the gas in one or more directions.

According to one implementation, as the UAV 700 is moving toward an object, it may be desirable to alter the orientation of the UAV 700 by thirty degrees so that the bottom of the UAV 700 first impacts the object and/or so that the propellers of the UAV are away from the object. Utilizing the damage avoidance system 101, it is determined that additional angular momentum is required in order to achieve the desired orientation before impact with the object. Accordingly, the damage avoidance system 101 causes the reorientation element 118 to expel gas through one or more openings 702 to provide additional angular momentum to alter the orientation of UAV 700 so that a thirty degree rotation can be achieved prior to impact.

As another implementation, the openings 702 in the UAV 700 may not use any propulsion element at all. In one implementation, the openings 702 may extend through the UAV 700 and are modifiable from either side of the UAV 700. For example, one or more openings 702 can be selectively opened or closed to alter the air resistance on a side of the UAV 700. A control element such as a solenoid and/or motor (not shown) in the UAV 700 may cause a cover to partially or completely block one or more of the openings 702, thereby altering the resistance on a side of the UAV 700. By increasing or decreasing the air resistance, the orientation of UAV 700 can be altered.

Figure 8A:
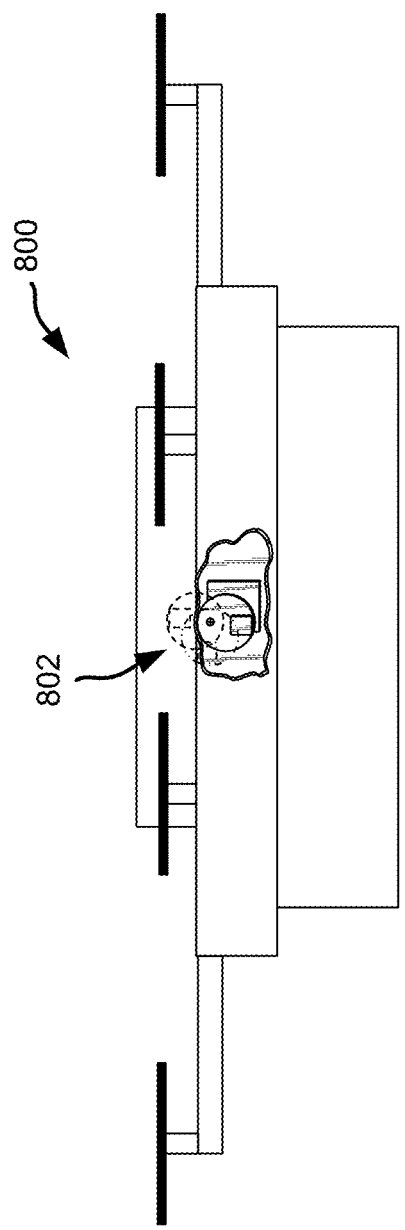
FIG. 8A illustrates an unmanned aerial vehicle having a reorientation element that includes a rotational modifier, according to an implementation.
Figure 8B:
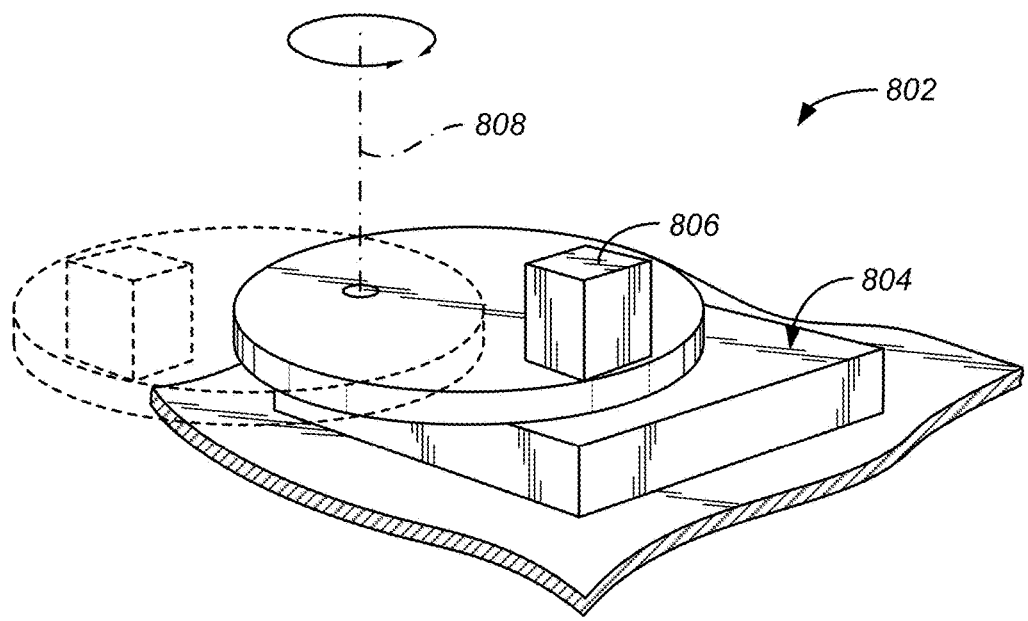
FIG. 8B illustrates a reorientation element that includes the rotational modifier of FIG. 8A in one possible position, according to an implementation.
Figure 8C:
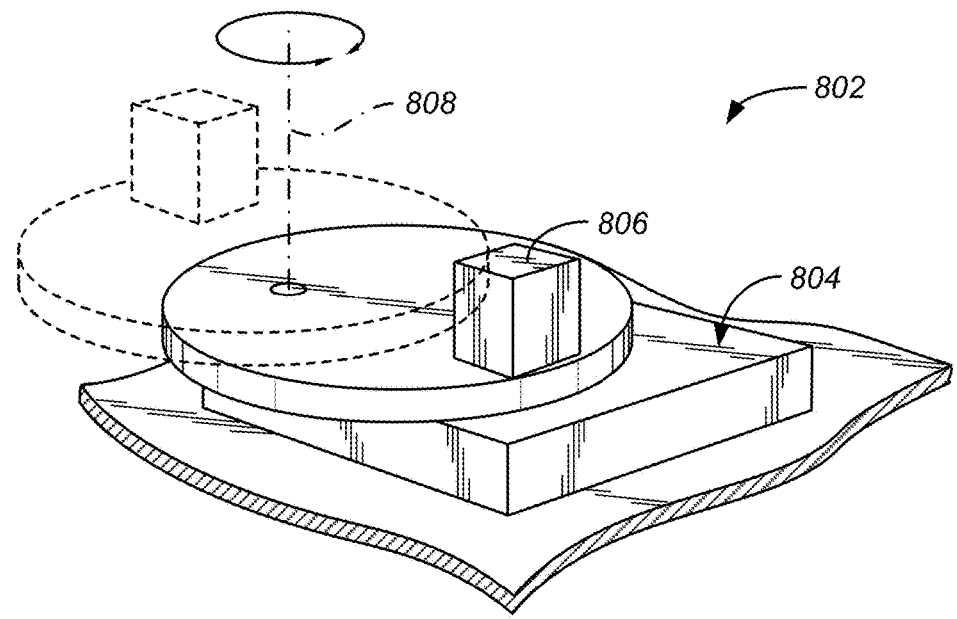
FIG. 8C illustrates a reorientation element that includes the rotational modifier of FIG. 8A in another possible position, according to an implementation.

FIGS. 8A, 8B and 8C illustrate an implementation of an UAV 800 where the reorientation element 118 (FIG. 1B) includes a rotational modifier 802. The rotational modifier 802 may be any number of components that can modify the rotation of the UAV 800. Modifying the rotation of the UAV 800 may allow a desired side of the UAV 800 to first impact the object and/or to orient the UAV 800 so the propellers are away from the object.

An illustrative rotational modifier 802 may be an actuator or other type of vibration mechanism, such as a motor 804 (FIG. 8B) attached to an offset weight. The vibration mechanism can rotate to a selected position and then vibrate on a side of the UAV 800 to provide impulses in a particular direction to increase or decrease rotation of the UAV 800. In some implementations, the rotational modifier 802 can be a gyroscope. For example, a gyroscope can be designed to increase or decrease the rate of rotation of the UAV 800. In operation, when the damage avoidance system 101 determines that, based on the current rate of rotation of the UAV 800, a side of the UAV 800 with the protection element 120 will not be properly oriented, the damage avoidance system 101 may cause the protection system 107 to activate a gyroscope (reorientation element 118) to reorient the UAV 800 to a desired orientation.

While in some implementations the rotational modifier 802 is operable to rotate an offset weight such that it creates a substantially continuous vibration in the device, in other implementations, the offset weight can be rotated into one or more alternative positions from its normal position in order to alter the center of mass of UAV 800. For example, FIG. 8B illustrates an implementation of reorientation element 118 (FIG. 1B) that includes the rotational modifier 802 of FIG. 8A in one possible alternative position. As depicted, the rotational modifier 802 is operable to rotate offset weight 806 about axis 808. The position of the offset weight 806 depicted in solid lines can denote a position in which the offset weight 806 is in a normal position, while the position depicted in hashed lines depicts the offset weight 806 in a first offset position. Similarly, FIG. 8C illustrates an implementation of reorientation element 118 that includes the rotational modifier 802 of FIG. 8A in a second possible alternative position. Here, the position depicted in solid lines again denotes the position in which the offset weight 806 is in a normal position, while the position depicted in hashed lines depicts the offset weight 806 in a second offset position. Accordingly, the center of mass of UAV 800 is altered as needed by moving the offset weight 806 into these example alternative positions.

Figure 9A:
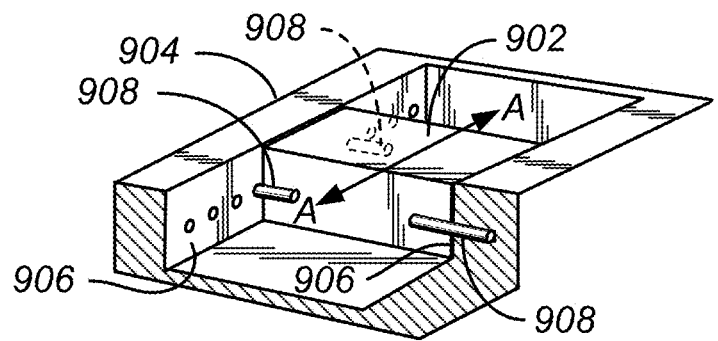
FIG. 9A illustrates a reorientation element that may be included in an unmanned aerial vehicle, according to an implementation.
Figure 9B:
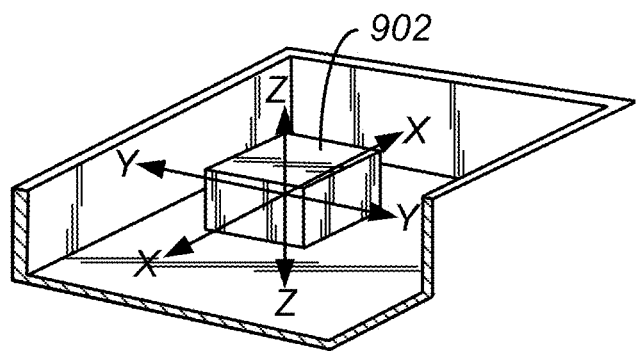
FIG. 9B illustrates another reorientation element that may be included in an unmanned aerial vehicle, according to an implementation.

FIGS. 9A and 9B illustrate an implementation of a reorientation element 118 incorporated into an UAV that includes a movable weight 902. FIG. 9A illustrates a compartment 904 of the UAV that includes the reorientation element 118. The compartment 904 may be internal to the UAV or part of the external housing of the UAV. A movable weight 902, when moved, alters the center of gravity of the UAV 900 to cause a change in the rate or direction of rotation of the UAV 900.

In one implementation, the movable weight 902 is a relatively heavy component of the UAV 900, such as a power module 112 (FIG. 1A). By altering the location of the movable weight 902 within the compartment 904, the center of gravity of the UAV 900 is altered. Using a power module 112 as the movable weight 902 to change the center of gravity of the UAV 900, as well as providing power to the UAV 900, allows the power module to serve multiple purposes and eliminates the need to have a separate movable weight 902 in the UAV 900.

FIG. 9A illustrates that, according to some implementations, the movable weight 902 may be placed on rails 906 within compartment 904 in the UAV 900. The movable weight 902 may be held in place by various objects, such as retractable pins 908, that can releasably control an object in place along the rails 906. When it is desired to relocate the movable weight 902 within compartment 904 in order to change the center of gravity of the UAV 900, one set of pins 908 may be withdrawn to allow the movable weight 902 to slide along the rails 906 to a new location within the UAV 900. Alternatively, or in addition to the rails 906, a motor (not shown) can cause the movable weight 902 to move along the rails 906 to a desired location.

Although FIG. 9A illustrates that the movable weight 902 has only one degree of freedom along the rails 906 (as shown by arrow A-A), FIG. 9B illustrates that the movable weight 902 may be able to move in additional degrees of freedom (e.g. along any number of axes, including the X, Y and Z axes) in other implementations. At some time after recovery of the UAV 900, the movable weight 902 can be returned to its original position and re-secured on the rails 906. In yet other implementations, the movable weight 902 is an example of an ejectable element that can be completely ejected from the UAV 900. This ejection can serve to change the center of mass of the UAV 900, cause the UAV 900 to have a lower mass at impact and/or alter the orientation of the UAV 900 from the force of the ejection of the movable weight 902 (e.g. from springs or other mechanisms operable to eject the movable weight 902 from the UAV 900). The ejectable element can include one or more relatively heavy components of the UAV 900. Alternatively, the ejectable element may be the deployment projectile 208 (FIG. 2A) discussed above.

While the above examples discuss techniques for avoiding and/or reducing damage to an object that may be impacted by a UAV, other avoidance measures may also be provided. For example, in addition to deploying a protection element to reduce a potential for damage to an object at impact, an audible and/or visual output may be generated to alert an object to a potential impact. For example, if the damage avoidance system is activated, in addition to deploying the protection element, an audible tone or warning message may be transmitted from the UAV to alert an object to the potential impact from the UAV. Likewise, a notification or alert may be transmitted from the UAV to the UAV management system and/or other UAVs to notify the UAV management system and/or other UAVs that the damage avoidance system has been activated. The notification may include, among other information, the location of the UAV, the time at which the damage avoidance system was activated, the reason(s) for the activation, etc.

FIG. 10 depicts a block diagram of an UAV network 1000 that includes UAVs 100, delivery locations 1003, relay locations 1002, materials handling facilities 1004 and remote computing resources 1010, according to an implementation. In addition, one or more fixed position transmitters 1005 may be included in the environment that transmit fixed position information (e.g., geographic coordinates), weather, information from other UAVs, information from the UAV management system, etc. The fixed position transmitters may be included at any known, fixed location. For example, the fixed position transmitters may be included on a materials handling facility(s) 1004, relay location(s) 1002, delivery location(s) 1003, on cellular towers (not shown), on buildings, on landing areas, or at any other known location.

Each of the UAVs 100, delivery locations 1003, relay locations 1002, materials handling facilities 1004 and/or remote computing resources 1010 may be configured to communicate with one another. For example, the UAVs 100 may be configured to form a wireless mesh network that utilizes Wi-Fi or another wireless means of communication, each UAV communicating with other UAVs within wireless range. In other implementations, the UAVs 100, UAV management system 1026, materials handling facilities 1004, relay locations 1002 and/or the delivery locations 1003 may utilize existing wireless networks (e.g., cellular, Wi-Fi, satellite) to facilitate communication. Likewise, the remote computing resources 1010, materials handling facilities 1004, delivery locations 1003 and/or relay locations 1002 may also be included in the wireless mesh network. In some implementations, one or more of the remote computing resources 1010, materials handling facilities 1004, delivery locations 1003 and/or relay locations 1002 may also communicate with each other via another network (wired and/or wireless), such as the Internet.

The remote computing resources 1010 may form a portion of a network-accessible computing platform implemented as a computing infrastructure of processors, storage, software, data access, and other components that is maintained and accessible via a network, such as the mesh network and/or another wireless or wired network (e.g., the Internet). As illustrated, the remote computing resources 1010 may include one or more servers, such as servers 1020(1), 1020(2), . . . , 1020(N). These servers 1020(1)-(N) may be arranged in any number of ways, such as server farms, stacks, and the like that are commonly used in data centers. Furthermore, the servers 1020(1)-(N) may include one or more processors 1022 and memory 1024 which may store a UAV management system 1026.

The UAV management system 1026 may be configured, for example, to communicate with the delivery locations 1003, UAVs 100, materials handling facilities 1004, and/or relay locations 1002. As an example, position information for each UAV 100 may be determined and shared among UAVs. Each UAV may periodically transmit, for example, automatic dependent surveillance-broadcast ("ADS-B") information to other UAVs in the network. When information, such as ADS-B information, is sent to or from an UAV, the information may include an identifier for the UAV and each UAV may act as a node within the network, forwarding the information until it is received by the intended UAV. For example, the UAV management system 1026 may send a message to UAV 100-6 by transmitting the information and the identifier of the intended receiving UAV to one or more of UAVs 100-1, 100-2, 100-3, 100-4 that are in wireless communication with the UAV management system 1026. Each receiving UAV will process the identifier to determine if it is the intended recipient and then forward the information to one or more other UAVs that are in communication with the UAV. For example, UAV 100-2 may forward the message and the identification of the intended receiving UAV to UAV 100-1, 100-3 and 100-5. In such an example, because 100-3 has already received and forwarded the message, it may discard the message without forwarding it again, thereby reducing load on the mesh network 1000. The other UAVs, upon receiving the message, may determine that they are not the intended recipients and forward it on to other nodes. This process may continue until the message reaches the intended recipient.

In some implementations, if an UAV loses communication with other UAVs via the wireless mesh network, it may activate another wireless communication path to regain connection. For example, if an UAV cannot communicate with any other UAVs via the mesh network 1000, it may activate a cellular and/or satellite communication path to obtain communication information from the UAV management system 1026, materials handling facility 1004, relay location 1002 and/or a delivery location 1003. If the UAV still cannot regain communication and/or if it does not include an alternative communication component, it may automatically and autonomously navigate toward a designated location (e.g., a nearby materials handling facility 1004, relay location 1002 and/or delivery location 1003).

The wireless mesh network 1000 may be used to provide communication between UAVs (e.g., to share weather information including wind speeds and directions, location information, routing information, landing areas), the UAV management system 1026, materials handling facilities 1004, delivery locations 1003 and/or relay locations 1002. In some implementations, if an UAV 100 initiates a protection procedure and/or deploys a protection element, it may communicate to the other components of the UAV network 1000 that it has initiated a protection procedure and/or deployed a protection element, and may also provide other information. For example, an UAV 100 may provide location information, a beacon signal, and/or other information to aid in the recovery of the UAV 100 in the event the UAV impacts an object.

In addition, in some implementations, the wireless mesh network may be used to deliver content and/or other information to other computing resources, such as personal computers, electronic book reading devices, audio players, mobile telephones, tablets, desktops, laptops, etc. For example, the mesh network may be used to deliver electronic book content to electronic book reading devices of customers.

Figure 11:
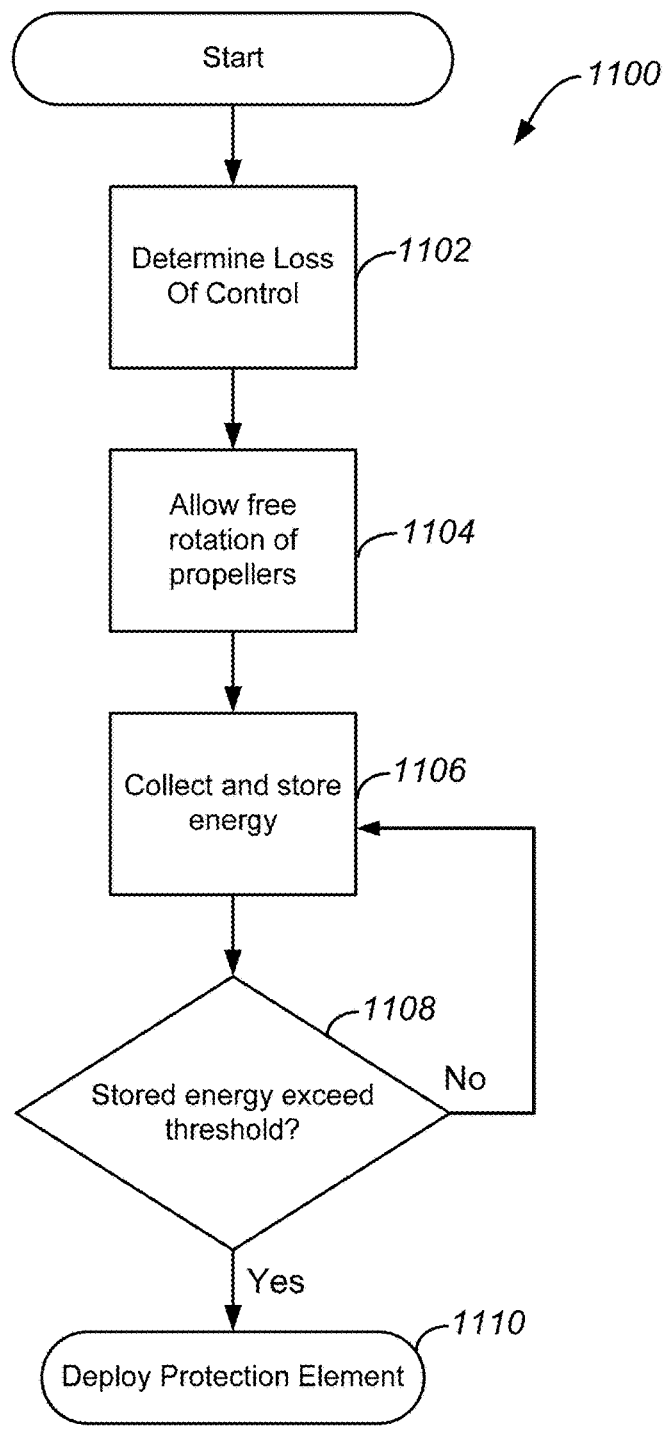
FIG. 11 is a flowchart illustrating a process for protecting an object from impact by an unmanned aerial vehicle, according to an implementation.

FIG. 11 depicts a flow diagram of an example process 1100 for deploying a protection element, according to an implementation. This process, and each process described herein, may be implemented by the architectures described herein or by other architectures. The process is illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process. Additionally, one or more of the operations may be considered optional and/or not utilized with other operations.

The example process 1100 begins by detecting a loss of control of the UAV (e.g., the UAV is in an uncontrolled descent, is not following the flight path, has lost power, etc.), as in 1102. In response to detecting a loss of control of the UAV, the propellers may be disengaged and allowed to freely rotate in response to the wind passing through the propellers, as in 1104. By allowing the propellers to freely rotate, the kinetic energy of the UAV descending toward the ground can be used to generate energy that may be stored, as in 1106. For example, the generated energy may be stored in one or more capacitors, power modules, etc.

In addition to storing generated energy, a determination may be made as to whether the amount of stored energy exceeds a threshold, as in 1108. For example, as discussed above, a backup protective measure may include automatically initiating the protective element in response to a capacitor becoming fully charged (threshold) from energy generated from the freely rotating propellers. In other implementations, decision block 1108 may be controlled and/or replaced by the damage avoidance system 101 (FIG. 1B) deciding whether to initiate the protection element.

If it is determined that the stored energy does not exceed a threshold (e.g., a capacity of the one or more capacitors), or if the damage avoidance system determines not to initiate the protection element, the example process 1100 returns to block 1106 and continues. However, if the stored energy does exceed the threshold and/or the damage avoidance system initiates the protection element, the protection element is deployed, as in 1110. For example, a solenoid, mechanical actuator, discharge element, etc., may be energized or activated by a discharge of the stored energy to deploy any of the protection elements discussed above to reduce a risk of damage to an object with which the UAV may collide.

Figure 12:
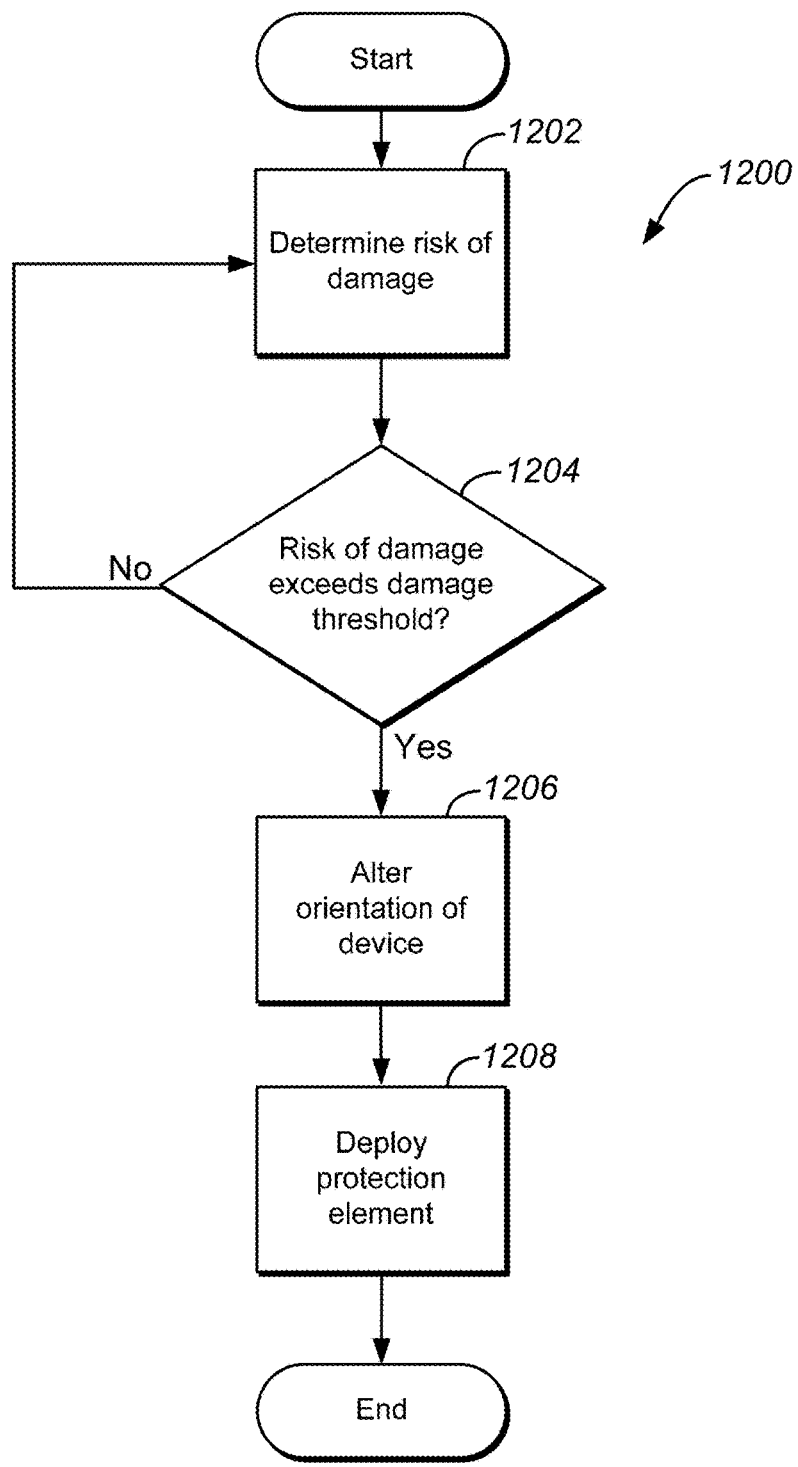
FIG. 12 is a flowchart illustrating another process for protecting an object from impact by an unmanned aerial vehicle, according to an implementation.

FIG. 12 is a flowchart illustrating a method 1200 executed by damage avoidance system 101 for protecting an object from potential damage using a safety monitoring system 103 and a protection system 107, as described above. At step 1202, damage avoidance system 101 determines a risk of potential damage to an object from an impact by the UAV 100. In some implementations, damage avoidance system 101 periodically makes this determination. In other implementations, damage avoidance system 101 continuously (e.g., real-time) makes this determination. For example, damage avoidance system 101 may utilize one or more of the distance detector 109, motion detector 111, system operability detector 113 and/or object type detector 115 to determine the risk of potential damage to an object if impacted by the UAV 100. Damage avoidance system 101 may weigh the information provided by each detector in the safety monitoring system 103 differently when assessing a risk of potential damage.

At step 1204, the damage avoidance system 101 determines whether a risk of potential damage to an object exceeds a damage risk threshold. If the damage avoidance system 101 determines that a risk of damage does not exceed a damage risk threshold, the example process 1200 returns to step 1202. At a time after damage avoidance system 101 determines that a risk of damage to an object resulting from an impact by the UAV 100 exceeds a damage risk threshold, at step 1206 damage avoidance system 101 alters, if necessary, the orientation of the UAV 100. For example, if orientation detector 116 determines that the UAV 100 is already in a desired orientation, then the UAV 100 is not reoriented prior to impact. If reorientation of the UAV 100 is required, reorientation element 118 alters the orientation of the UAV 100 one or more times prior to impact until the protection element 120 is positioned so that it can be deployed in a manner that will reduce or eliminate damage to the UAV caused by the impact. At step 1208, the protection element 120 may be deployed. The protection element 120 may be deployed before, during or after the reorientation of the UAV 100.

While the above examples discuss autonomous engagement of the damage avoidance system and autonomous deployment of a protection element, in other implementations, the damage avoidance system and/or protection element deployment may be semi-autonomous or manual. For example, any of the routines or damage avoidance system activations may include a human operator that is notified, authorizes and/or activates the damage avoidance system or deploys the protection element. In other implementations, if the UAV is under manual control, the operator controlling the UAV may activate the damage avoidance system and/or deploy the protection element.

Figure 13:
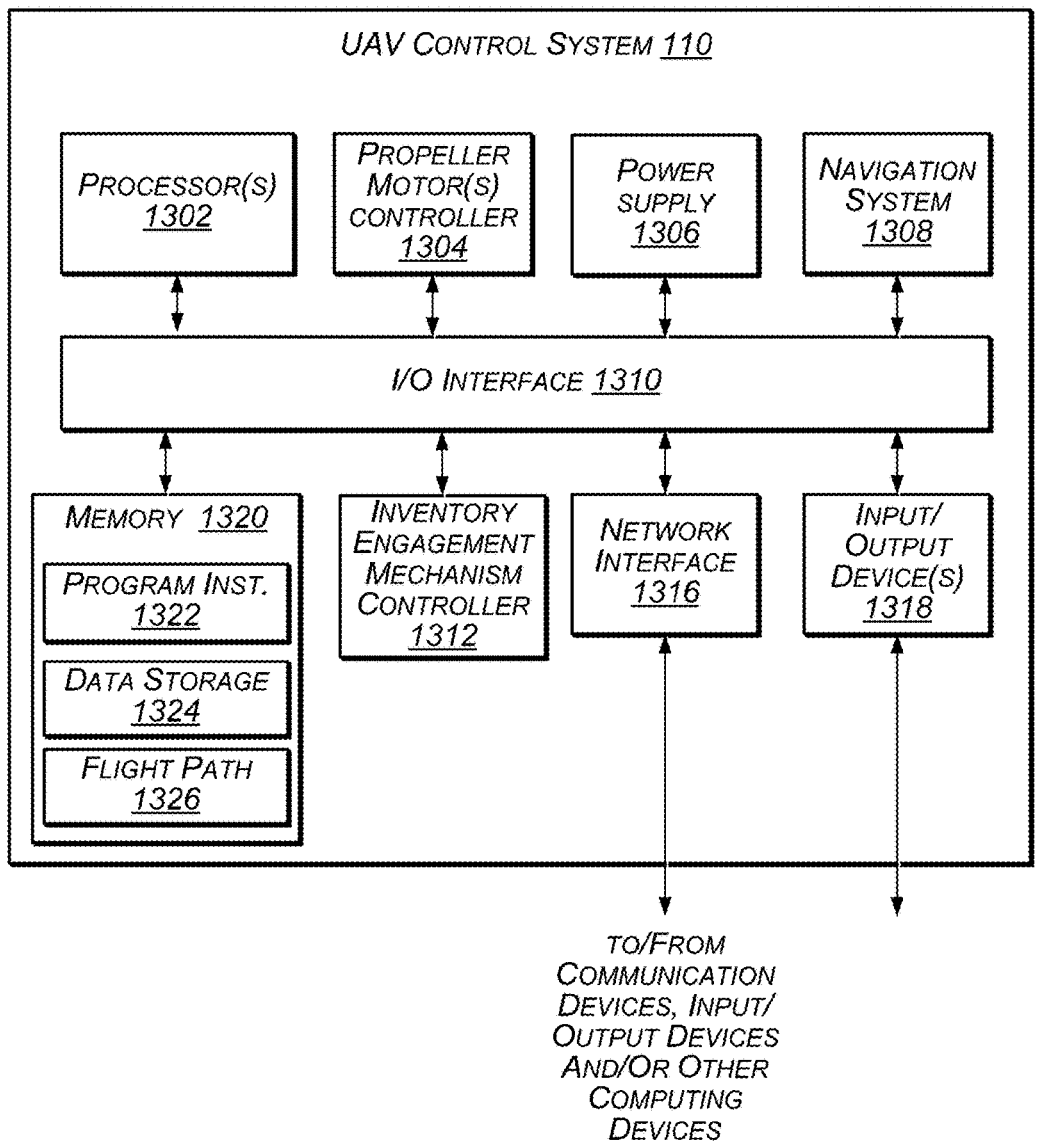
FIG. 13 is a block diagram illustrating various components of an unmanned aerial vehicle control system, according to an implementation.

FIG. 13 is a block diagram illustrating an example UAV control system 110 of the UAV 100. In various examples, the block diagram may be illustrative of one or more aspects of the UAV control system 110 that may be used to implement the various systems and methods discussed above. In the illustrated implementation, the UAV control system 110 includes one or more processors 1302, coupled to a non-transitory computer readable storage medium 1320 via an input/output (I/O) interface 1310. The UAV control system 110 may also include a propeller motor controller 1304, power supply module 1306 and/or a navigation system 1308. The UAV control system 110 further includes an inventory engagement mechanism controller 1312, a network interface 1316, and one or more input/output devices 1318.

In some implementations, the UAV control system 110 may include the damage avoidance system 101, discussed above. In such an implementation, the UAV control system 110 and the damage avoidance system 101 may utilize one or more common sensors, memories, data stores, communication components, etc. However, in other implementations, as discussed herein, the UAV control system 110 and the damage avoidance system 101 may be separate systems that utilize some or all of their own components and/or power modules. Separating the damage avoidance system 101 from the UAV control system 110 may provide additional redundancy and operability in the event of a failure.

In various implementations, the UAV control system 110 may be a uniprocessor system including one processor 1302, or a multiprocessor system including several processors 1302 (e.g., two, four, eight, or another suitable number). The processor(s) 1302 may be any suitable processor capable of executing instructions. For example, in various implementations, the processor(s) 1302 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1302 may commonly, but not necessarily, implement the same ISA.

The non-transitory computer readable storage medium 1320 may be configured to store executable instructions, data, flight paths and/or data items accessible by the processor(s) 1302. In various implementations, the non-transitory computer readable storage medium 1320 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1320 as program instructions 1322, data storage 1324 and flight path data 1326, respectively. In other implementations, program instructions, data and/or flight paths may be received, sent or stored upon different types of computer-accessible media, such as non-transitory media, or on similar media separate from the non-transitory computer readable storage medium 1320 or the UAV control system 110. Generally speaking, a non-transitory, computer readable storage medium may include storage media or memory media, such as magnetic or optical media, e.g., disk or CD/DVD-ROM, coupled to the UAV control system 110 via the I/O interface 1310. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 1316.

In one implementation, the I/O interface 1310 may be configured to coordinate I/O traffic between the processor(s) 1302, the non-transitory computer readable storage medium 1320, and any peripheral devices, the network interface or other peripheral interfaces, such as input/output devices 1318. In some implementations, the I/O interface 1310 may perform any necessary protocol, timing or other data transformations to convert data signals from one component (e.g., non-transitory computer readable storage medium 1320) into a format suitable for use by another component (e.g., processor(s) 1302). In some implementations, the I/O interface 1310 may include support for devices attached through various types of peripheral buses, such as a variant of the Peripheral Component Interconnect (PCI) bus standard or the Universal Serial Bus (USB) standard, for example. In some implementations, the function of the I/O interface 1310 may be split into two or more separate components, such as a north bridge and a south bridge, for example. Also, in some implementations, some or all of the functionality of the I/O interface 1310, such as an interface to the non-transitory computer readable storage medium 1320, may be incorporated directly into the processor(s) 1302.

The propeller motor(s) controller 1304 communicates with the navigation system 1308 and adjusts the power of each propeller motor to guide the UAV along a determined flight path. As described above, in some implementations, one or more of the propellers and propeller motors may be used to generate energy resulting from an uncontrolled descent of the UAV. In various implementations, such energy generation procedures may dictate changes to the operation of the selected propeller motors. For example, electricity may no longer be supplied to the associated propeller motors, the angles of the motor mounts may be adjusted, and/or any energy generated by the propeller motors may be routed for various functions (e.g., recharging one or more power modules, power a sensor, power the damage avoidance system 101, deploy a protection element, charge a capacitor, etc.)

The power supply module 1306 may control the charging and any switching functions associated with one or more power modules (e.g., batteries) of the UAV. The navigation system 1308 may include a GPS or other similar system that can be used to navigate the UAV to and/or from a location. The inventory engagement mechanism controller 1312 communicates with the motor(s) (e.g., a servo motor) used to engage and/or disengage inventory. For example, when the UAV is positioned over a level surface at a delivery location, the inventory engagement mechanism controller 1312 may provide an instruction to a motor that controls the inventory engagement mechanism to release the inventory.

The network interface 1316 may be configured to allow data to be exchanged between the UAV control system 110, other devices attached to a network, such as other computer systems, and/or with UAV control systems of other UAVs. For example, the network interface 1316 may enable wireless communication between numerous UAVs. In various implementations, the network interface 1316 may support communication via wireless general data networks, such as a Wi-Fi network. For example, the network interface 1316 may support communication via telecommunications networks, such as cellular communication networks, satellite networks, and the like.

Input/output devices 1318 may, in some implementations, include one or more displays, image capture devices, thermal sensors, infrared sensors, time of flight sensors, accelerometers, pressure sensors, weather sensors, airflow sensors, etc. Multiple input/output devices 1318 may be present and controlled by the UAV control system 110. One or more of these sensors may be utilized to assist in landings as well as avoiding obstacles during flight. In some implementations, the one or more sensors may be utilized by the damage avoidance system 101. However, in other implementations, the sensors of the damage avoidance system 101 and the UAV control system 110 may be separate.

As shown in FIG. 13, the memory may include program instructions 1322 which may be configured to implement the example processes and/or sub-processes described above. The data storage 1324 may include various data stores for maintaining data items that may be provided for determining flight paths, retrieving inventory, landing, identifying a level surface for disengaging inventory, etc. Likewise, the damage avoidance system may include program instructions which may be configured to implement one or more of the example processes and/or sub-processes described above.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV control system 110 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The UAV control system 110 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system 110 and/or the damage avoidance system 101. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV control system 110 and/or the damage avoidance system 101 may be transmitted to the UAV control system 110 and/or the damage avoidance system 101 via transmission media or signals, such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other UAV control system configurations.

Figure 14:
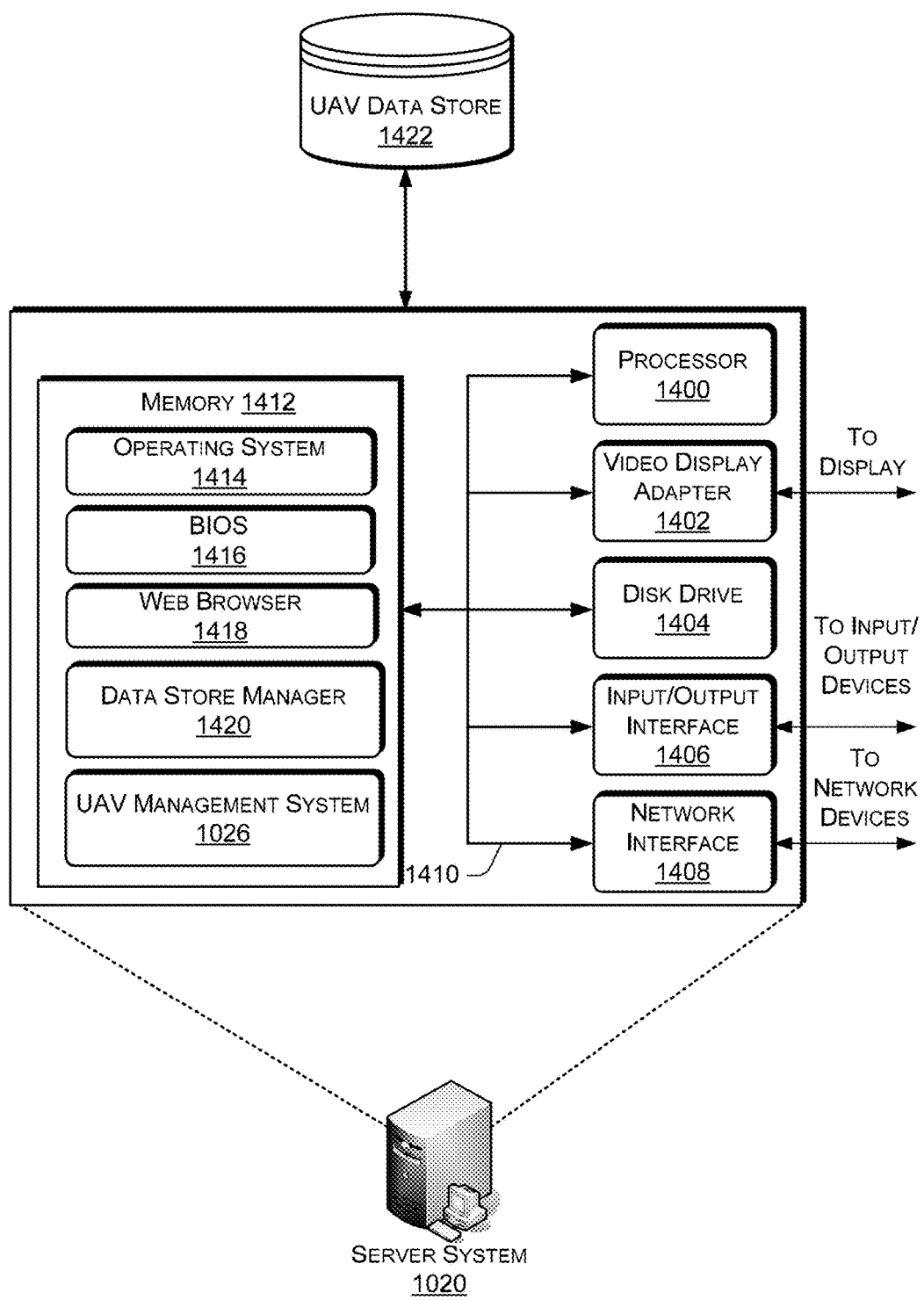
FIG. 14 is a block diagram of an illustrative implementation of a server system that may be used with various implementations.

FIG. 14 is a pictorial diagram of an illustrative implementation of a server system, such as the server system 1020, that may be used in the implementations described herein. The server system 1020 may include a processor 1400, such as one or more redundant processors, a video display adapter 1402, a disk drive 1404, an input/output interface 1406, a network interface 1408, and a memory 1412. The processor 1400, the video display adapter 1402, the disk drive 1404, the input/output interface 1406, the network interface 1408, and the memory 1412 may be communicatively coupled to each other by a communication bus 1410.

The video display adapter 1402 provides display signals to a local display (not shown in FIG. 14) permitting an operator of the server system 1020 to monitor and configure operation of the server system 1020. The input/output interface 1406 likewise communicates with external input/output devices not shown in FIG. 14, such as a mouse, keyboard, scanner, or other input and output devices that can be operated by an operator of the server system 1020. The network interface 1408 includes hardware, software, or any combination thereof, to communicate with other computing devices. For example, the network interface 1408 may be configured to provide communications between the server system 1020 and other computing devices, such as an UAV, materials handling facility, relay location and/or a delivery location, as shown in FIG. 10.

The memory 1412 generally comprises random access memory (RAM), read-only memory (ROM), flash memory, and/or other volatile or permanent memory. The memory 1412 is shown storing an operating system 1414 for controlling the operation of the server system 1020. A binary input/output system (BIOS) 1416 for controlling the low-level operation of the server system 1020 is also stored in the memory 1412.

The memory 1412 additionally stores program code and data for providing network services to the UAV management system 1026. Accordingly, the memory 1412 may store a browser application 1418. The browser application 1418 comprises computer executable instructions that, when executed by the processor 1400, generate or otherwise obtain configurable markup documents such as Web pages. The browser application 1418 communicates with a data store manager application 1420 to facilitate data exchange between the UAV data store 1422 and/or other data stores.

As used herein, the term "data store" refers to any device or combination of devices capable of storing, accessing and retrieving data, which may include any combination and number of data servers, databases, data storage devices and data storage media, in any standard, distributed or clustered environment. The server system 1020 can include any appropriate hardware and software for integrating with the UAV data store 1422 as needed to execute aspects of one or more applications for the UAV management system, UAVs, materials handling facilities, delivery locations, and/or relay locations.

The data store 1422 can include several separate data tables, databases or other data storage mechanisms and media for storing data relating to a particular aspect. For example, the data store 1422 illustrated includes UAV information, weather information, wind speeds and directions, flight path information, source location information, destination location information, etc., which can be used to generate and deliver information to the UAV management system 1026, materials handling facilities, delivery locations, UAVs, relay locations, and/or users. It should be understood that there can be many other aspects that may be stored in the UAV data store 1422. The data stores 1422 are operable, through logic associated therewith, to receive instructions from the server system 1020 and obtain, update or otherwise process data in response thereto.

The memory 1412 may also include the UAV management system 1026, discussed above. The UAV management system 1026 may be executable by the processor 1400 to implement one or more of the functions of the server system 1020. In one implementation, the UAV management system 1026 may represent instructions embodied in one or more software programs stored in the memory 1412. In another implementation, the UAV management system 1026 can represent hardware, software instructions, or a combination thereof.

The server system 1020, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction in FIG. 14 should be taken as being illustrative in nature and not limiting to the scope of the disclosure.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A computer-implemented method, comprising:
    under control of one or more computing systems configured with executable instructions,
        determining a risk of damage resulting from an impact between an unmanned aerial vehicle and an object;
        determining that the risk of damage exceeds a threshold;
        determining an orientation of the unmanned aerial vehicle relative to the object;
        selecting a protection element, from a plurality of protection elements, for deployment based at least in part on the determined orientation; and
        deploying from the unmanned aerial vehicle, prior to the impact, the protection element configured to reduce a damage to at least one of the object or the unmanned aerial vehicle caused by the impact between the unmanned aerial vehicle and the object.

2. The computer-implemented method of claim 1, further comprising:
    altering the orientation of the unmanned aerial vehicle to position the protection element so that deployment of the protection element will reduce the damage to at least one of the object or the unmanned aerial vehicle.

3. The computer-implemented method of claim 2, wherein the unmanned aerial vehicle is reoriented to position the protection element between a body of the unmanned aerial vehicle and the object at impact.

4. The computer-implemented method of claim 2, wherein the unmanned aerial vehicle is reoriented to position a body of the unmanned aerial vehicle between the protection element and the object so that the protection element is deployed away from the object.

5. The computer-implemented method of claim 2, wherein the orientation of the unmanned aerial vehicle is altered using a reorientation element, wherein the reorientation element includes at least one of a propulsion element, a movable weight, an actuator, a gyroscope or a modifiable opening.

6. The computer-implemented method of claim 1, wherein the risk of damage is determined based at least in part on a kinetic energy of the unmanned aerial vehicle at impact with the object, a velocity of the unmanned aerial vehicle, or a distance between the unmanned aerial vehicle and the object.

7. An unmanned aerial vehicle, comprising:
    a body;
    a propeller;
    a safety monitoring system configured to detect a risk of damage to an object resulting from an impact between the unmanned aerial vehicle and the object; and
    a protection system configured to determine an orientation of the unmanned aerial vehicle relative to the object, select a protection element, from a plurality of protection elements, for deployment based at least in part on the determined orientation, and deploy the protection element prior to the impact between the unmanned aerial vehicle and the object.

8. The unmanned aerial vehicle of claim 7, wherein the safety monitoring system includes at least one of a distance detector configured to measure a distance between the unmanned aerial vehicle and the object, a motion detector configured to measure a motion of the unmanned aerial vehicle, a system operability detector configured to monitor an operability of at least one component of the unmanned aerial vehicle, an object type detector configured to determine a type of the object, or an energy detector configured to determine a kinetic energy of the unmanned aerial vehicle at an impact with the object.

9. The unmanned aerial vehicle of claim 7, wherein the plurality of protection elements include at least one of a parachute, an airbag, a propulsion element, or a spring.

10. The unmanned aerial vehicle of claim 7, further comprising:
    a reorientation element configured to reorient the unmanned aerial vehicle to allow deployment of the protection element in an intended direction with respect to the object.

11. The unmanned aerial vehicle of claim 10, wherein the reorientation element is at least one of a compressed gas cartridge configured to expel gas from the cartridge to cause a reorientation of the unmanned aerial vehicle, a liquid filled cartridge configured to expel an incompressible liquid from the cartridge to cause a reorientation of the unmanned aerial vehicle, a rotational modifier, or a movable weight that may be repositioned with respect to the body of the unmanned aerial vehicle and cause a reorientation of the unmanned aerial vehicle.

12. The unmanned aerial vehicle of claim 7, wherein the protection element includes:
   a parachute; and
   a deployment projectile coupled to the parachute and configured to be discharged from the protection element to speed a deployment of the parachute by pulling the parachute from the protection element when the deployment projectile is discharged.

13. The unmanned aerial vehicle of claim 12, wherein the deployment projectile is discharged from the unmanned aerial vehicle by at least one of igniting a propellant, releasing a propellant, releasing a compressed gas, releasing a compressed water, igniting a solid-fuel rocket, releasing a spring, or activating a solenoid.

14. The unmanned aerial vehicle of claim 13, wherein the propellant is the deployment projectile.

15. The unmanned aerial vehicle of claim 7, wherein:
   the protection system:
      includes a plurality of parachutes coupled to respective different locations on the body of the unmanned aerial vehicle;
      and
      deploys a selected parachute of the plurality of parachutes that is approximately on an opposite side of the body of the unmanned aerial vehicle with respect to the object.

16. An aerial vehicle, comprising:
   a distance detector configured to measure a distance between the aerial vehicle and an object; and
   a protection system configured to determine an orientation of the aerial vehicle relative to the object, select a protection element, from a plurality of protection elements, for deployment based at least in part on the determined orientation, and activate the protection element prior to an impact between the aerial vehicle and the object.

17. The aerial vehicle of claim 16, wherein the plurality of protection elements include at least one of a parachute, an airbag, a propulsion element, or a spring.

18. The aerial vehicle of claim 16, further comprising:
   a reorientation element configured to reorient the aerial vehicle to allow activation of the protection element in an intended direction with respect to the object.

19. The aerial vehicle of claim 16, wherein the protection element includes:
   a parachute; and
   a deployment projectile coupled to the parachute and configured to be discharged from the protection element to speed a deployment of the parachute by pulling the parachute from the protection element when the deployment projectile is discharged.

20. The aerial vehicle of claim 16, further comprising:
   a safety monitoring system configured to determine, based at least in part on the measured distance, a risk of damage to the object resulting from an impact between the aerial vehicle and the object.

* * * * *